US012609789B2

(12) United States Patent (10) Patent No.: US 12,609,789 B2
Fang et al. (45) Date of Patent: Apr. 21, 2026

(54) TRANSMISSION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Yun Fang, Guangdong (CN); Zhihua Shi, Guangdong (CN); Wenhong Chen, Guangdong (CN); Yingpei Huang, Guangdong (CN); Jiejiao Tian, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 376 days.

(21) Appl. No.: 18/330,769

(22) Filed: Jun. 7, 2023

(65) Prior Publication Data

US 2023/0327819 A1 Oct. 12, 2023

Related U.S. Application Data

(63) Continuation of application No. PCT/CN2021/070658, filed on Jan. 7, 2021.

(51) Int. Cl.
*H04L 1/1829* (2023.01)
*H04L 5/00* (2006.01)
*H04W 72/23* (2023.01)

(52) U.S. Cl.
CPC .......... *H04L 1/1861* (2013.01); *H04L 5/0051* (2013.01); *H04W 72/23* (2023.01)

(58) Field of Classification Search
None
See application file for complete search history.

(56) References Cited

U.S. PATENT DOCUMENTS

| | | | | |
|---|---|---|---|---|
| 2020/0213979 A1* | 7/2020 | Chen | .................... | H04B 7/0617 |
| 2020/0382252 A1 | 12/2020 | Sun | | |
| 2021/0226680 A1* | 7/2021 | Khoshnevisan | ..... | H04B 7/0404 |
| 2021/0360657 A1* | 11/2021 | Ma | ........................ | H04L 1/1887 |

(Continued)

FOREIGN PATENT DOCUMENTS

| | | |
|---|---|---|
| CN | 110536452 | 12/2019 |
| CN | 110838860 | 2/2020 |

(Continued)

OTHER PUBLICATIONS

EPO, Extended European Search Report issued in European Application No. 21916772.3, Nov. 23, 2023.

(Continued)

*Primary Examiner* — Phirin Sam

(74) *Attorney, Agent, or Firm* — Hodgson Russ LLP

(57) ABSTRACT

A transmission method, a terminal device, and a network device are provided. The method includes the following. A terminal device receives sounding reference signal (SRS) resource indicator (SRI) information, where the SRI information is indicative of an SRS resource to be used by the terminal device for uplink repetitions. The SRI information includes a first indication and/or at least one second indication, where the first indication indicates the number of transmission layers and a first SRS resource to be used by the terminal device for a first transmission in the uplink repetitions, and the second indication indicates a second SRS resource to be used by the terminal device for a second transmission in the uplink repetitions. A receiver and/or a beam direction for the first transmission is different from a receiver and/or a beam direction for the second transmission.

16 Claims, 10 Drawing Sheets

(56) References Cited

U.S. PATENT DOCUMENTS

| | | | | |
|---|---|---|---|---|
| 2023/0024738 | A1* | 1/2023 | Khoshnevisan | H04W 72/0473 |
| 2023/0063015 | A1* | 3/2023 | Muruganathan | H04L 5/0091 |
| 2023/0179281 | A1* | 6/2023 | Svedman | H04B 7/0695 |
| | | | | 455/101 |
| 2025/0317928 | A1* | 10/2025 | Yang | H04W 72/1268 |

FOREIGN PATENT DOCUMENTS

| | | |
|---|---|---|
| CN | 110868282 | 3/2020 |
| CN | 110912665 | 3/2020 |
| CN | 111512582 | 8/2020 |
| CN | 111954986 | 11/2020 |
| WO | 2020253825 | 12/2020 |

OTHER PUBLICATIONS

"3rd Generation Partnership Project; Technical Specification Group Radio Access Network; NR; Multiplexing and channel coding (Release 16)," 3GPP TS 38.212, Jun. 2020, v16.2.0.

Oppo, "Enhancements on multi-TRP for PDCCH, PUCCH and PUSCH," 3GPP TSG RAN WG1 #103-e, R1-2008218, Oct. 2020.

Ericsson, "On PDCCH, PUCCH and PUSCH enhancements with multiple TRPs," 3GPP TSG-RAN WG1 Meeting #103, R1-2009223, Oct. 2020.

Qualcomm Incorporated, "Enhancements on Multi-TRP for PDCCH, PUCCH and PUSCH," 3GPP TSG-RAN WG1 Meeting #103-e, R1-2009251, Oct. 2020.

Nokia et al., "Summary of Multi-TRP URLLC for PUCCH and PUSCH," 3GPP TSG RAN WG1 #103, R1-2009480, Oct. 2020.

Huawei et al., "Other issues on NR eMIMO in R16," 3GPP TSG RAN WG1 Meeting #99, R1-1912920, Nov. 2019.

WIPO, International Search Report and Written Opinion for International Application No. PCT/CN2021/070658, Oct. 9, 2021.

EPO, Communication for EP Application No. 21916772.3, Aug. 21, 2024.

CNIPA, First Office Action for CN Application No. 202180074016.5, Oct. 12, 2024.

* cited by examiner

100

110

120    120

S210

RECEIVE, BY TERMINAL DEVICE, SRI
INFORMATION INCLUDING FIRST
INDICATION AND AT LEAST ONE SECOND
INDICATION, WHERE SRI INFORMATION IS
INDICATIVE OF SRS RESOURCE TO BE
USED BY TERMINAL DEVICE FOR UPLINK
REPETITIONS

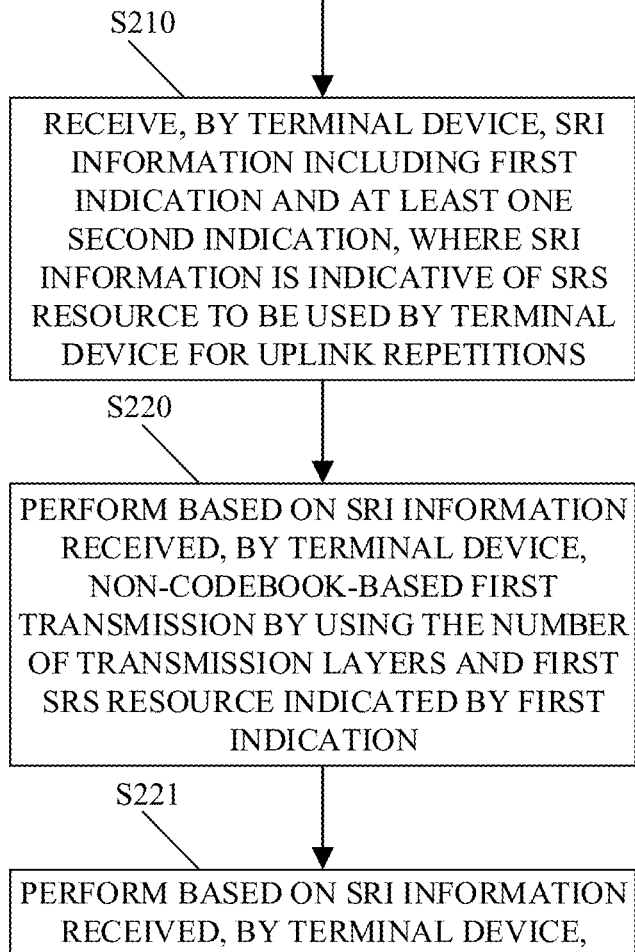

S210

RECEIVE, BY TERMINAL DEVICE, SRI
INFORMATION INCLUDING FIRST
INDICATION AND AT LEAST ONE
SECOND INDICATION, WHERE SRI
INFORMATION IS INDICATIVE OF SRS
RESOURCE TO BE USED BY TERMINAL
DEVICE FOR UPLINK REPETITIONS

S220

PERFORM BASED ON SRI INFORMATION
RECEIVED, BY TERMINAL DEVICE,
NON-CODEBOOK-BASED FIRST
TRANSMISSION BY USING THE NUMBER
OF TRANSMISSION LAYERS AND FIRST
SRS RESOURCE INDICATED BY FIRST
INDICATION

S221

PERFORM BASED ON SRI INFORMATION
RECEIVED, BY TERMINAL DEVICE,
NON-CODEBOOK-BASED SECOND
TRANSMISSION BY USING THE NUMBER
OF TRANSMISSION LAYERS INDICATED
BY FIRST INDICATION OR THE NUMBER
OF TRANSMISSION LAYERS INDICATED
BY SECOND INDICATION, AND SECOND
SRS RESOURCE INDICATED BY SECOND
INDICATION

FIG. 3

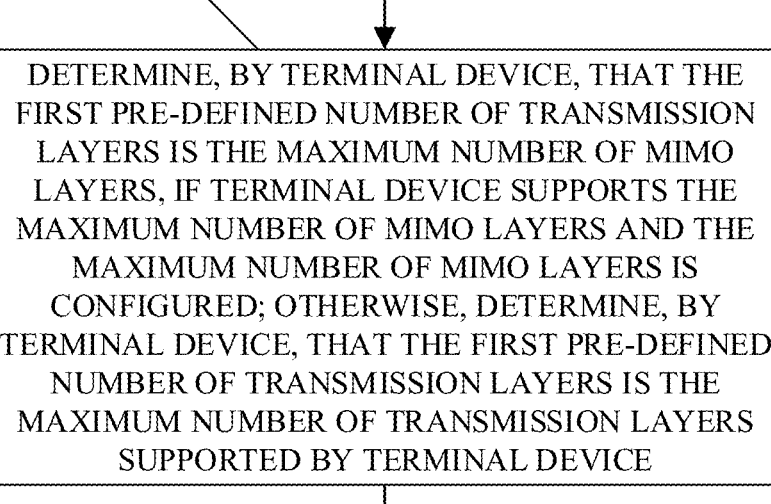

S101

DETERMINE, BY TERMINAL DEVICE, THAT THE FIRST PRE-DEFINED NUMBER OF TRANSMISSION LAYERS IS THE MAXIMUM NUMBER OF MIMO LAYERS, IF TERMINAL DEVICE SUPPORTS THE MAXIMUM NUMBER OF MIMO LAYERS AND THE MAXIMUM NUMBER OF MIMO LAYERS IS CONFIGURED; OTHERWISE, DETERMINE, BY TERMINAL DEVICE, THAT THE FIRST PRE-DEFINED NUMBER OF TRANSMISSION LAYERS IS THE MAXIMUM NUMBER OF TRANSMISSION LAYERS SUPPORTED BY TERMINAL DEVICE

S102

SEND, BY TERMINAL DEVICE, TO NETWORK DEVICE THE FIRST PRE-DEFINED NUMBER OF TRANSMISSION LAYERS DETERMINED

FIG. 4

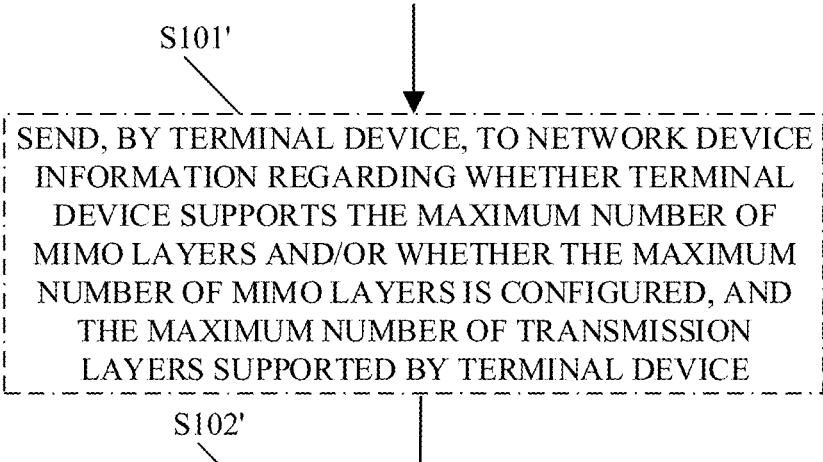

S101'

SEND, BY TERMINAL DEVICE, TO NETWORK DEVICE
INFORMATION REGARDING WHETHER TERMINAL
DEVICE SUPPORTS THE MAXIMUM NUMBER OF
MIMO LAYERS AND/OR WHETHER THE MAXIMUM
NUMBER OF MIMO LAYERS IS CONFIGURED, AND
THE MAXIMUM NUMBER OF TRANSMISSION
LAYERS SUPPORTED BY TERMINAL DEVICE

S102'

DETERMINE, BY NETWORK DEVICE, THAT THE FIRST
PRE-DEFINED NUMBER OF TRANSMISSION LAYERS
IS THE MAXIMUM NUMBER OF MIMO LAYERS, IF
TERMINAL DEVICE SUPPORTS THE MAXIMUM
NUMBER OF MIMO LAYERS AND THE MAXIMUM
NUMBER OF MIMO LAYERS IS CONFIGURED;
OTHERWISE, DETERMINE, BY NETWORK DEVICE,
THAT THE FIRST PRE-DEFINED NUMBER OF
TRANSMISSION LAYERS IS THE MAXIMUM NUMBER
OF TRANSMISSION LAYERS SUPPORTED BY
TERMINAL DEVICE

FIG. 5

| ...... | ONE SRI FIELD (ONE SRI) | ...... |
|---|---|---|

PDCCH

FIG. 6

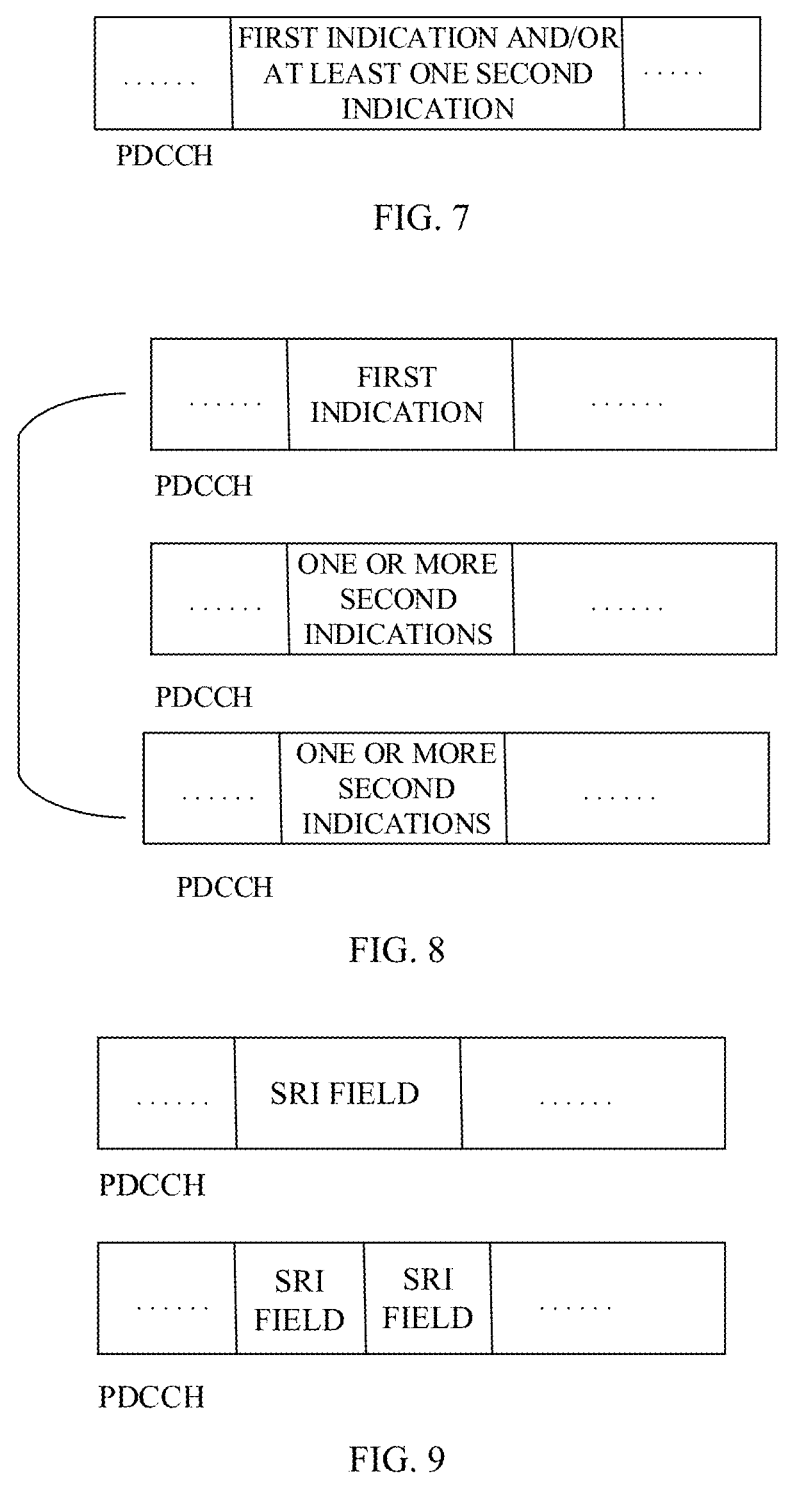

| . . . . . . | FIRST INDICATION AND/OR AT LEAST ONE SECOND INDICATION | · · · · · |
|---|---|---|

PDCCH

FIG. 7

| . . . . . . | FIRST INDICATION | . . . . . . |
|---|---|---|

PDCCH

| . . . . . . | ONE OR MORE SECOND INDICATIONS | . . . . . . |
|---|---|---|

PDCCH

| . . . . . . | ONE OR MORE SECOND INDICATIONS | . . . . . . |
|---|---|---|

PDCCH

FIG. 8

| . . . . . . | SRI FIELD | . . . . . . |
|---|---|---|

PDCCH

| . . . . . . | SRI FIELD | SRI FIELD | . . . . . . |
|---|---|---|---|

PDCCH

PERFORM, BY TERMINAL DEVICE, NON-
CODEBOOK-BASED UPLINK REPETITIONS
FOR SINGLE RECEIVER AND/OR SINGLE
BEAM DIRECTION, IN RESPONSE TO ONLY
FIRST INDICATION BEING RECEIVED

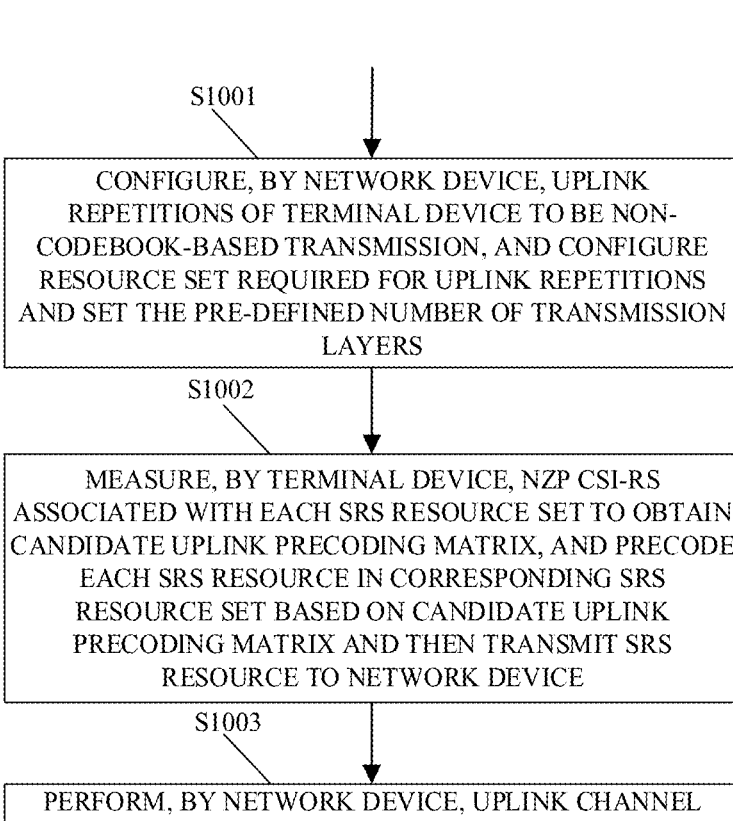

S1001

CONFIGURE, BY NETWORK DEVICE, UPLINK REPETITIONS OF TERMINAL DEVICE TO BE NON-CODEBOOK-BASED TRANSMISSION, AND CONFIGURE RESOURCE SET REQUIRED FOR UPLINK REPETITIONS AND SET THE PRE-DEFINED NUMBER OF TRANSMISSION LAYERS

S1002

MEASURE, BY TERMINAL DEVICE, NZP CSI-RS ASSOCIATED WITH EACH SRS RESOURCE SET TO OBTAIN CANDIDATE UPLINK PRECODING MATRIX, AND PRECODE EACH SRS RESOURCE IN CORRESPONDING SRS RESOURCE SET BASED ON CANDIDATE UPLINK PRECODING MATRIX AND THEN TRANSMIT SRS RESOURCE TO NETWORK DEVICE

S1003

PERFORM, BY NETWORK DEVICE, UPLINK CHANNEL DETECTION BASED ON SRS TRANSMITTED BY TERMINAL DEVICE, AND DETERMINE PRECODING MATRIX THAT IS TO BE USED BY TERMINAL DEVICE FOR UPLINK REPETITIONS

S1004

DETERMINE, BY NETWORK DEVICE, SRI INFORMATION INCLUDING FIRST INDICATION AND SECOND INDICATION, THAT IS, DETERMINE THE NUMBER OF BITS AND BIT VALUE OF FIRST INDICATION AND THE NUMBER OF BITS AND BIT VALUE OF SECOND INDICATION, AND SEND SRI INFORMATION TO TERMINAL DEVICE ON PDCCH

S1005

PERFORM, BY TERMINAL DEVICE, BLIND DETECTION ON PDCCH TRANSMITTED BY NETWORK DEVICE, DETERMINE RESOURCE INDICATION INFORMATION INDICATED BY FIRST INDICATION AND SECOND INDICATION IN THE PDCCH, SUCH AS THE NUMBER OF TRANSMISSION LAYERS AND/OR SRS RESOURCE, AND PERFORM PUSCH REPETITION BASED ON RESOURCE INDICATION INFORMATION DETERMINED

DETERMINE, BY NETWORK DEVICE, SRI
INFORMATION INCLUDING FIRST
INDICATION AND/OR AT LEAST ONE
SECOND INDICATION, WHERE SRI
INFORMATION IS INDICATIVE OF SRS
RESOURCE TO BE USED BY TERMINAL
DEVICE FOR UPLINK REPETITIONS

TERMINAL DEVICE 400

TRANSCEIVER 410

PROCESSOR 420

TRANSMISSION METHOD, TERMINAL DEVICE, AND NETWORK DEVICE

CROSS-REFERENCE TO RELATED APPLICATION(S)

This application is a continuation of International Application No. PCT/CN2021/070658, filed Jan. 7, 2021, the entire disclosure of which is incorporated herein by reference.

TECHNICAL FIELD

This disclosure relates to the field of communication, and more particularly to a transmission method, a terminal device, and a network device.

BACKGROUND

In order to meet current requirements on rate, delay, high-speed mobility, energy efficiency, etc. and to cope with diversity and complexity of services in future life, the 3rd generation partnership project (3GPP) international standard organization begins to research and develop a $5^{th}$ generation (5G) mobile communication technology. 5G is mainly applied to enhanced mobile broadband (eMBB), ultra reliability and low latency communication (URLLC), and massive machine type communication (mMTC).

In 3GPP release 17 (R17), physical uplink shared channel (PUSCH) transmission for multiple receivers (such as transmission and reception points (TRPs)) is enhanced, so as to support uplink repetitions for multiple receivers. However, for the case where a terminal device needs to, for example, send the same PUSCH to multiple receivers, there is currently no scheme for indicating a sounding reference signal (SRS) resource to be used by the terminal device.

SUMMARY

Implementations of the disclosure provide a transmission method. The method includes the following. A terminal device receives sounding reference signal (SRS) resource indicator (SRI) information, where the SRI information is indicative of an SRS resource to be used by the terminal device for uplink repetitions. The SRI information includes a first indication and/or at least one second indication, where the first indication indicates the number of transmission layers and a first SRS resource to be used by the terminal device for a first transmission in the uplink repetitions, and the second indication indicates a second SRS resource to be used by the terminal device for a second transmission in the uplink repetitions. A receiver and/or a beam direction for the first transmission is different from a receiver and/or a beam direction for the second transmission.

Implementations of the disclosure provide a terminal device. The terminal device includes a transceiver and a processor. The transceiver is configured to receive SRI information, where the SRI information is indicative of an SRS resource to be used by the terminal device for uplink repetitions, and the SRI information includes a first indication and/or at least one second indication. The processor is configured to parse the SRI information received, to obtain the number of transmission layers and a first SRS resource that are indicated by the first indication and to be used by the terminal device for a first transmission in the uplink repetitions, and a second SRS resource that is indicated by the second indication and to be used by the terminal device for a second transmission in the uplink repetitions.

Implementations of the disclosure provide a network device. The network device includes a processor and a transceiver. The processor is configured to determine SRI information, where the SRI information is indicative of an SRS resource to be used by a terminal device for uplink repetitions, and the SRI information includes first indication and/or at least one second indication. The transceiver is configured to send the determined SRI information to the terminal device. The first indication indicates the number of transmission layers and a first SRS resource to be used by the terminal device for a first transmission in the uplink repetitions, the second indication indicates a second SRS resource to be used by the terminal device for a second transmission in the uplink repetitions, and a receiver and/or a beam direction for the first transmission is different from a receiver and/or a beam direction for the second transmission.

BRIEF DESCRIPTION OF THE DRAWINGS

FIG. 3 is a schematic flowchart of a transmission method according to another implementation of the disclosure.

FIG. 4 is a schematic flowchart of a method for determining a first pre-defined number of transmission layers in the transmission method according to another implementation of the disclosure.

FIG. 5 is a schematic flowchart of a method for determining a first pre-defined number of transmission layers in the transmission method according to another implementation of the disclosure.

FIG. 6 is a schematic diagram illustrating a physical downlink control channel (PDCCH) packet structure in the related art.

FIG. 7 is a schematic diagram illustrating a PDCCH packet structure according to an implementation of the disclosure.

FIG. 8 is a schematic diagram illustrating a PDCCH packet structure according to another implementation of the disclosure.

FIG. 9 is a schematic diagram illustrating a PDCCH packet structure according to another implementation of the disclosure.

FIG. 11 is a schematic flowchart illustrating an example of the transmission method according to the disclosure.

DETAILED DESCRIPTION

Figure 1:
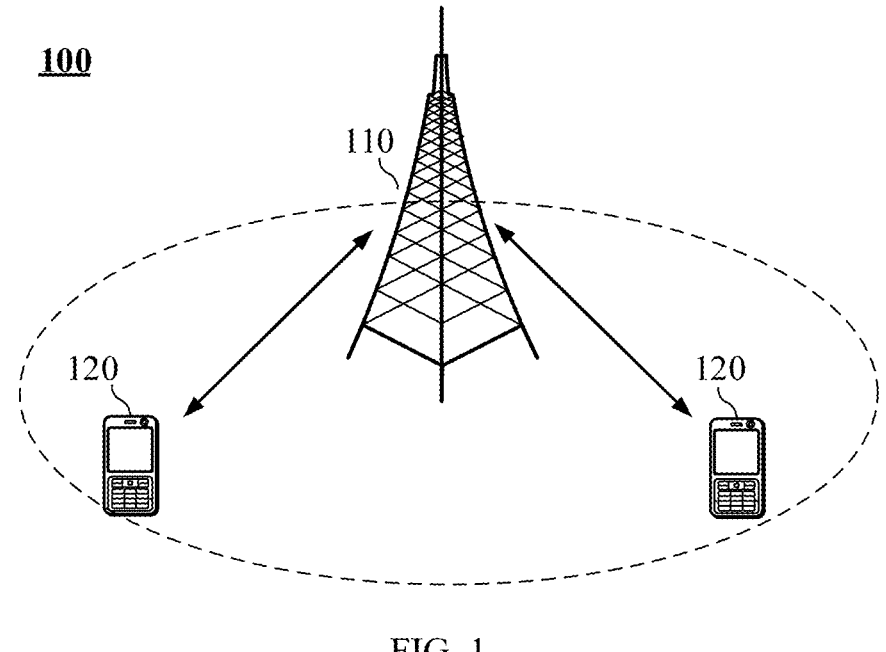
FIG. 1 is a schematic diagram illustrating an application scenario according to implementations of the disclosure.

The following will describe technical solutions of implementations of the disclosure with reference to the accompanying drawings in implementations of the disclosure.

Technical solutions of implementations of the disclosure are applicable to various communication systems, for example, a global system of mobile communication (GSM), a code division multiple access (CDMA) system, a wideband code division multiple access (WCDMA) system, a general packet radio service (GPRS), a long term evolution (LTE) system, an advanced LTE (LTE-A) system, a new radio (NR) system, an evolved system of an NR system, an LTE-based access to unlicensed spectrum (LTE-U) system, an NR-based access to unlicensed spectrum (NR-U) system, a universal mobile telecommunication system (UMTS), a wireless local area network (WLAN), a wireless fidelity (WiFi), a 5$^{th}$ generation (5G) system, or other communication systems.

Generally speaking, a conventional communication system generally supports a limited quantity of connections and therefore is easy to implement. However, with development of communication technology, a mobile communication system will not only support conventional communication but also support, for example, device to device (D2D) communication, machine to machine (M2M) communication, machine type communication (MTC), vehicle to vehicle (V2V) communication, or vehicle to everything (V2X) communication, etc. Implementations of the disclosure can also be applied to these communication systems.

Optionally, a communication system in implementations of the disclosure may be applied to a carrier aggregation (CA) scenario, a dual connectivity (DC) scenario, or a standalone (SA) network deployment scenario.

There is no limitation on the spectrum where implementations of the disclosure are applied. For example, implementations of the disclosure may be applied to a licensed spectrum, or may be applied to an unlicensed spectrum.

Various implementations of the disclosure are described in connection with a network device and a terminal device. The terminal device may also be referred to as a user equipment (UE), an access terminal, a subscriber unit, a subscriber station, a mobile station, a remote station, a remote terminal, a mobile device, a user terminal, a terminal, a wireless communication device, a user agent, or a user device, etc. The terminal device may be a station (ST) in a WLAN, a cellular radio telephone, a cordless telephone, a session initiation protocol (SIP) telephone, a wireless local loop (WLL) station, a personal digital assistant (PDA), a handheld device, a computing device with wireless communication functions, other processing devices coupled with a wireless modem, an in-vehicle device, a wearable device, and a terminal device in a next-generation communication system, for example, a terminal device in an NR network, or a terminal device in a future evolved public land mobile network (PLMN), etc.

By way of explanation rather than limitation, in implementations of the disclosure, the terminal device may also be a wearable device. The wearable device may also be called a wearable smart device, which is a generic term of wearable devices obtained through intelligentization design and development on daily wearing products with wearable technology, for example, glasses, gloves, watches, clothes, accessories, and shoes. The wearable device is a portable device that can be directly worn or integrated into clothes or accessories of a user. In addition to being a hardware device, the wearable device can also realize various functions through software support, data interaction, and cloud interaction. A wearable smart device in a broad sense includes, for example, a smart watch or smart glasses with complete functions and large sizes and capable of realizing independently all or part of functions of a smart phone, and for example, various types of smart bands and smart jewelries for physical monitoring, of which each is dedicated to application functions of a certain type and required to be used together with other devices such as a smart phone.

In implementations of the disclosure, the network device may be a device configured to communicate with a mobile device, and the network device may be an access point (AP) in a WLAN, a base transceiver station (BTS) in GSM or CDMA, may also be a Node B (NB) in WCDMA, and may also be an evolutional Node B (eNB or eNodeB) in LTE, or a relay station or AP, or an in-vehicle device, a wearable device, a network device in an NR network (gNB), or a network device in a future evolved PLMN, etc.

In implementations of the disclosure, the network device provides services for a cell, and the terminal device communicates with the network device on a transmission resource (for example, a frequency-domain resource or a spectrum resource) for the cell. The cell may be a cell corresponding to the network device (for example, a base station). The cell may correspond to a macro base station, or may correspond to a base station corresponding to a small cell. The small cell herein may include: a metro cell, a micro cell, a pico cell, a femto cell, and the like. These small cells are characterized by small coverage and low transmission power and are adapted to provide data transmission service with high-rate.

It should be understood that, "indication" referred to in implementations of the disclosure may be a direct indication, may be an indirect indication, or may mean that there is an association relationship. For example, A indicates B may mean that A directly indicates B, for instance, B can be obtained according to A; may mean that A indirectly indicates B, for instance, A indicates C, and B can be obtained according to C; or may mean that that there is an association relationship between A and B.

In the elaboration of implementations of the disclosure, the term "correspondence" may mean that there is a direct or indirect correspondence between the two, may mean that there is an association between the two, or may mean a relationship of indicating and indicated or configuring and configured, etc.

For better understanding of implementations of the disclosure, the related art will be elaborated first. The related art below, as an optional scheme, can be arbitrarily combined with the technical solutions of implementations of the disclosure, which shall all belong to the protection scope of the disclosure.

FIG. 1 exemplarily illustrates one network device 110 and two terminal devices 120. Optionally, a communication system 100 may also include multiple network devices 110, and there can be other quantities of terminal devices 120 in a coverage area of each of the network devices 110. Implementations of the disclosure are not limited in this regard.

Optionally, the communication system 100 may further include other network entities such as a mobility management entity (MME), an access and mobility management function (AMF), or the like, and implementations of the disclosure are not limited in this regard.

It should be understood that, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein generally indicates that the associated objects are in an "or" relationship.

Implementations of the disclosure provide a transmission method, a terminal device, a network device, and a communication system, which provide at least a scheme for indicating an SRS resource to be used by the terminal device in a scenario where the terminal device needs to transmit the same physical uplink shared channel (PUSCH) to multiple receivers.

Figure 2:
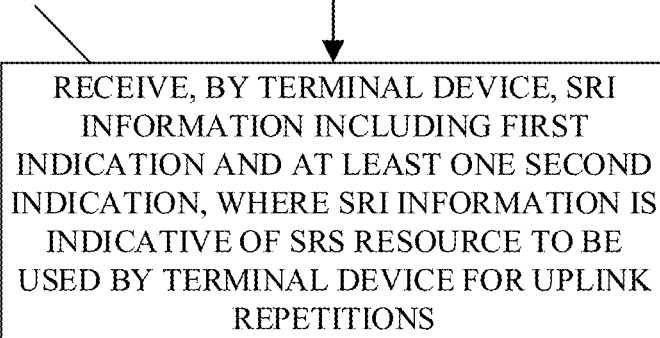
FIG. 2 is a schematic flowchart of a transmission method according to an implementation of the disclosure.

FIG. 2 is a schematic flowchart of a transmission method 200 according to an implementation of the disclosure. Optionally, the method may be applied to the system illustrated in FIG. 1, but the disclosure is not limited thereto. The method includes at least some of the following.

S210, a terminal device (for example, the communication device described above such as UE) receives sounding reference signal (SRS) resource indicator (SRI) information.

The SRI information is indicative of an SRS resource to be used by the terminal device for uplink repetitions. Optionally, the SRI information may be sent to the terminal device by a network device.

Optionally, according to implementations of the disclosure, the SRI information may include a first indication and/or at least one second indication.

The first indication may indicate the number (that is, quantity) of transmission layers and a first SRS resource to be used by the terminal device for a first transmission in the uplink repetitions. The second indication may indicate a second SRS resource to be used by the terminal device for a second transmission in the uplink repetitions.

A receiver and/or a beam direction for the first transmission may be different from a receiver and/or a beam direction for the second transmission. Optionally, the receiver includes a transmission and reception point (TRP).

Here, the term "uplink repetition (that is, uplink repetition transmission)" used herein may include, for example, physical uplink shared channel (PUSCH) repetition, and may also include repetition of a packet of other types and/or formats, as long as such packet can be transmitted in an uplink.

In the disclosure, "the SRI information may include the first indication and/or the at least one second indication" may specifically include, for example, the following cases. The SRI information may include the first indication and the at least one second indication; the SRI information may include only the first indication and does not include the second indication; or the SRI information may include only the at least one second indication and does not include the first indication, etc. In addition, the "at least one second indication" herein means that the SRI information may include one or more second indications, where each second indication is associated with one transmission (i.e. the second transmission) in the uplink repetitions that is different from the first transmission associated with the first indication. As can be seen, besides a scenario of uplink repetitions for two receivers and/or two beam directions, this disclosure is also applicable to a scenario of uplink repetitions for two or more receivers and/or two or more beam directions, and in addition, as detailed below, this disclosure is also applicable to a scenario of uplink repetitions for a single receiver and/or a single beam. That is, this disclosure is applicable to a scenario of any number (that is, quantity) of receivers and/or beam directions.

Optionally, the SRI information may further include other indications besides the first indication and the second indication.

"The receiver and/or the beam direction for the first transmission may be different from the receiver and/or the beam direction for the second transmission" may specifically include, for example, the following cases. The receiver for the first transmission may be different from the receiver for the second transmission, for example, the first transmission is intended for receiver 1, and the second transmission is intended for receiver 2. The beam direction for the first transmission may be different from the beam direction for the second transmission, for example, the first transmission is intended for beam direction 1, and the second transmission is intended for beam direction 2. The receiver and the beam direction for the first transmission may be different from the receiver and the beam direction for the second transmission, for example, the first transmission is intended for receiver 1 and beam direction 1, and the second transmission is intended for receiver 2 and beam direction 2, etc.

In the foregoing implementation of the disclosure, the terminal device may determine, according to the SRI information received, an SRS resource to be used for the uplink repetitions. In addition, the receiver and/or the beam direction for the first transmission in the uplink repetitions may be different from the receiver and/or the beam direction for the second transmission in the uplink repetitions. As such, in the implementation of the disclosure, at least a scheme for indicating an SRS resource to be used by the terminal device in a scenario where the terminal device needs to transmit the same PUSCH to multiple receivers is provided, thereby at least realizing support of uplink repetitions for multiple receivers and/or multiple beam directions.

Optionally, the second indication may contain or may not contain an indication of the number of transmission layers to be used by the terminal device for the second transmission.

In other words, the first indication may indicate the number of transmission layers and the first SRS resource to be used by the terminal device for the first transmission, and the second indication may indicate the second SRS resource to be used by the terminal device for the second transmission without indicating the number of transmission layers to be used by the terminal device for the second transmission. In this way, the number (that is, quantity or amount) of bits used in the second indication can be reduced, thereby reducing resource consumption of the second indication and thus improving coding rate of the SRI information and substantially improving resource utilization. As can be seen, according to the disclosure, it is possible to further solve the technical problem of how to improve coding rate and resource utilization for the case where uplink repetitions for multiple receivers and/or beam directions are supported for example in 5G technology. It should be noted that, the technical problem described herein is merely an example, and other technical problems can also be solved according to the disclosure, which therefore shall not be taken as limitation on the disclosure.

Optionally, if the second indication does not contain the indication of the number of transmission layers to be used by the terminal device for the second transmission, the number of transmission layers to be used by the terminal device for the second transmission is determined according to the number of transmission layers indicated by the first indication.

According to implementations of the disclosure, although the second indication may not indicate the number of transmission layers to be used by the terminal device for the second transmission, the terminal device may perform the second transmission by using the number of transmission layers indicated by the first indication. In other words, according to implementations of the disclosure, for a scenario of uplink repetitions for multiple receivers and/or beam directions, the number of transmission layers may be indicated only by the first indication and used as the number of transmission layers to be used for each transmission in the uplink repetitions. In this way, the number of bits of the SRI information may be saved as described above, thereby improving coding rate.

In addition, optionally, the SRI information may include an SRI field in a physical downlink control channel (PDCCH). For example, the SRI information may be an SRI field.

In other words, according to implementations of the disclosure, the terminal device can determine, according to the SRI field received, the SRS resource and/or the number of transmission layers to be used for the uplink repetitions.

Optionally, as illustrated in FIG. 3, according to implementations of the disclosure, the method may further include the following.

S220, based on the SRI information received, the terminal device performs a non-codebook-based first transmission by using the number of transmission layers and the first SRS resource indicated by the first indication.

Similarly, as illustrated in FIG. 3, according to implementations of the disclosure, the method may further include the following.

S221, based on the SRI information received, the terminal device performs a non-codebook-based second transmission by using the number of transmission layers indicated by the first indication or the number of transmission layers indicated by the second indication, and the second SRS resource indicated by the second indication.

Here, S220 and S221 may be combined into one step, or may be separated steps as illustrated in FIG. 3, and the disclosure is not limited in this regard.

As can be seen, in implementations of the disclosure, the uplink repetitions may be performed in a non-codebook-based mode.

In addition, although non-codebook-based uplink repetition is exemplarily provided above, the disclosure is not limited to non-codebook-based uplink repetition, and other transmission modes can also be supported. Technical solutions that do not depart from the technical concept of the disclosure shall all fall within the protection scope of the disclosure.

Optionally, the first SRS resource is selected from a first SRS resource set configured for the terminal device, and the second SRS resource is selected from a second SRS resource set configured for the terminal device.

In implementations of the disclosure, in order to meet requirements for supporting uplink repetitions for multiple receivers and/or different beam directions, two or more SRS resource sets may be configured, so that an SRS resource required can be selected from a corresponding SRS resource set.

Optionally, the first SRS resource includes one or more SRS resources, and/or the second SRS resource includes one or more SRS resources.

In implementations of the disclosure, each of the number (that is, quantity) of the first SRS resource indicated by the first indication and the number of the second SRS resource indicated by the second indication may not be limited to one, and instead, may be one or multiple, and the disclosure is not limited in this regard.

Optionally, according to implementations of the disclosure, the number (that is, quantity) of SRS resources in the first SRS resource set may be equal to or different from the number of SRS resources in the second SRS resource set.

In implementations of the disclosure, the number of SRS resources in the first SRS resource set and the number of SRS resources in the second SRS resource set may be set according to actual needs and/or actual cases, etc., and the number of SRS resources in the first SRS resource set may be equal to or different from the number of SRS resources in the second SRS resource set, and all these shall fall within the protection scope of the disclosure.

Optionally, according to implementations of the disclosure, the number of transmission layers indicated by the first indication does not exceed a pre-defined number of transmission layers.

In implementations of the disclosure, when setting the number of transmission layers to be used for the first transmission and/or the second transmission, the number of transmission layers being set cannot exceed the pre-defined number of transmission layers, that is, may be less than or equal to the pre-defined number of transmission layers. It can be considered that the "pre-defined number of transmission layers" herein means a "maximum number of transmission layers that can be set" by a network side, that is, when setting the number of transmission layers required for the uplink repetitions of the terminal device, the number of transmission layers cannot exceed the "maximum number of transmission layers that can be set". For example, if the "pre-defined number of transmission layers" is four, when setting the number of transmission layers required for the uplink repetitions of the terminal device, the number of transmission layers required for the uplink repetitions of the terminal device can be set to one, two, three, or four, but cannot be set to be greater than four. In addition, each time when setting the number of transmission layers for the uplink repetitions of the terminal device, the number to be set depends on actual situations, for example, the number to be set can be determined according to factors such as a channel detection result, resource usage, a transmission priority, etc.

Optionally, according to implementations of the disclosure, the pre-defined number of transmission layers may be determined according to at least one of: a first pre-defined number of transmission layers $L_1$, where the first pre-defined number of transmission layers $L_1$ may depend on the number of transmission layers supported by the terminal device; a second pre-defined number of transmission layers $L_2$, where the second pre-defined number of transmission layers $L_2$ may be the number of transmission layers that is set for the uplink repetitions; or a third pre-defined number of transmission layers $L_3$, where the third pre-defined number of transmission layers $L_3$ may be determined according to at least one of the number of SRS resources in the first SRS resource set or the number of SRS resources in the second SRS resource set.

In implementations of the disclosure, an exemplary manner of determining the pre-defined number of transmission layers is provided, that is, the pre-defined number of transmission layers may be determined according to the first pre-defined number of transmission layers $L_1$, the second pre-defined number of transmission layers $L_2$, or the third pre-defined number of transmission layers $L_3$, or may be determined according to any combination of the above three, such as a combination of any two of the three or a combination of all of the three, and the disclosure is not limited in this regard. In addition, the manner of determining the pre-defined number of transmission layers in the disclosure is not limited to the exemplary manner provided herein, and instead, the pre-defined number of transmission layers may also be determined in other manners.

The "number of transmission layers supported by the terminal device" mentioned above when describing the first pre-defined number of transmission layers $L_1$ relates to a transmission capability of the terminal device.

The second pre-defined number of transmission layers $L_2$ may be the number of transmission layers that is set for the uplink repetitions. That is, a specific number (that is, quantity) of transmission layers may be dedicatedly set to be the number of transmission layers to be used for the uplink repetitions. In this case, the specific number of transmission layers may be directly taken as the pre-defined number of transmission layers. Alternatively, the specific number of transmission layers may be taken as an option for selection together with other options (such as the first pre-defined number of transmission layers, the third pre-defined number of transmission layers, etc.), so as to determine the pre-defined number of transmission layers.

As described above, the third pre-defined number of transmission layers $L_3$ may be determined according to at least one of the number of SRS resources in the first SRS resource set or the number of SRS resources in the second SRS resource set, that is, the third pre-defined number of transmission layers $L_3$ may be determined according to the number of SRS resources, which may specifically include the following. For example, the third pre-defined number of transmission layers $L_3$ may be determined according to the number of SRS resources in the first SRS resource set, or the third pre-defined number of transmission layers $L_3$ may be determined according to the number of SRS resources in the second SRS resource set, or the third pre-defined number of transmission layers $L_3$ may be determined according to the number of SRS resources in the first SRS resource set as well as the number of SRS resources in the second SRS resource set.

Optionally, the first pre-defined number of transmission layers $L_1$ may be determined by the terminal device and then sent to the network device, or the first pre-defined number of transmission layers $L_1$ may be determined by the network device. If the terminal device supports a maximum number of multi-input multi-output (MIMO) layers (that is, maximum MIMO layers or maxMIMO-Layers) and the maximum number of MIMO layers is configured, the first pre-defined number of transmission layers $L_1$ is the maximum number of MIMO layers; otherwise, the first pre-defined number of transmission layers $L_1$ is a maximum number of transmission layers supported by the terminal device.

For example, as illustrated in FIG. 4, optionally, according to implementations of the disclosure, the above method may further include the following.

S101, if the terminal device supports the maximum number of MIMO layers and the maximum number of MIMO layers is configured, the terminal device determines that the first pre-defined number of transmission layers $L_1$ is the maximum number of MIMO layers; otherwise, the terminal device determines that the first pre-defined number of transmission layers $L_1$ is the maximum number of transmission layers supported by the terminal device.

S102, the terminal device sends to the network device the first pre-defined number of transmission layers $L_1$ determined.

Step S101 and step S102 in implementations of the disclosure may be performed before a network side determines the SRI information (such as the SRI field), or may be performed before the terminal device receives the SRI information.

In implementations of the disclosure, if the terminal device, such as UE, supports the maximum number of MIMO layers and the maximum number of MIMO layers is configured, the maximum number of MIMO layers may be taken as the first pre-defined number of transmission layers $L_1$; otherwise, the maximum number of transmission layers supported by the UE may be taken as the first pre-defined number of transmission layers $L_1$.

Optionally, the maximum number of MIMO layers may be configured by radio resource control (RRC).

As can be seen, in implementations of the disclosure, the first pre-defined number of transmission layers $L_1$ may be determined by the terminal device itself, and then the first pre-defined number of transmission layers $L_1$ determined may be sent to the network device.

Optionally, as illustrated in FIG. 5, according to implementations of the disclosure, the method may further include the following.

S101', the terminal device sends to the network device information regarding whether the terminal device supports the maximum number of MIMO layers and/or whether the maximum number of MIMO layers is configured, and the maximum number of transmission layers supported by the terminal device.

S102', if the terminal device supports the maximum number of MIMO layers and the maximum number of MIMO layers is configured, the network device determines that the first pre-defined number of transmission layers $L_1$ is the maximum number of MIMO layers; otherwise, the network device determines that the first pre-defined number of transmission layers $L_1$ is the maximum number of transmission layers supported by the terminal device.

In implementations of the disclosure, the terminal device may only report related information (for example, information regarding whether the terminal device supports the maximum number of MIMO layers and/or whether the maximum number of MIMO layers is configured, and the maximum number of transmission layers supported by the terminal device, etc.) to the network device, and then the network device determines the first pre-defined number of transmission layers $L_1$.

In addition, if the network device itself is able to determine information regarding whether the terminal device supports the maximum number of MIMO layers and/or whether the maximum number of MIMO layers is configured, and the maximum number of transmission layers supported by the terminal device, etc., step S101' may be omitted, that is, step S101' is optional (as illustrated by a dotted line box in FIG. 5).

As can be seen, no matter whether the first pre-defined number of transmission layers $L_1$ is determined by the terminal device or is determined by the network device, the logic of determination is similar, that is, if the terminal device can support the maximum number of MIMO layers and the maximum number of MIMO layers is configured, determine that the first pre-defined number of transmission layers $L_1$ is the maximum number of MIMO layers; otherwise, determine that the first pre-defined number of transmission layers $L_1$ is the maximum number of transmission layers supported by the terminal device. In other words, if the terminal device can support the maximum number of MIMO layers and the maximum number of MIMO layers is configured, the maximum number of MIMO layers is preferentially taken as the first pre-defined number of transmission layers $L_1$; otherwise, the maximum number of transmission layers supported by the terminal device is taken as the first pre-defined number of transmission layers $L_1$.

An example of determining the first pre-defined number of transmission layers $L_1$ is given above, but the disclosure is not limited thereto, and the first pre-defined number of transmission layers $L_1$ may also be determined in other manners.

Optionally, according to implementations of the disclosure, the pre-defined number of transmission layers may be the minimum between the first pre-defined number of transmission layers $L_1$ and the second pre-defined number of transmission layers $L_2$. That is, the minimum between the first pre-defined number of transmission layers $L_1$ and the second pre-defined number of transmission layers $L_2$ may be selected as the pre-defined number of transmission layers.

Optionally, according to implementations of the disclosure, the pre-defined number of transmission layers may be the minimum among the first pre-defined number of transmission layers $L_1$, the second pre-defined number of transmission layers $L_2$, and the third pre-defined number of transmission layers $L_3$. That is, the minimum among the above three may be selected as the pre-defined number of transmission layers.

Some examples of determining the pre-defined number of transmission layers are given above, but the disclosure is not limited to these examples, and the pre-defined number of transmission layers may also be determined in other manners. For example, a value of the number of transmission layers can be pre-set as the maximum value of the number of transmission layers which is set for the uplink repetitions of the terminal device by the network side in the disclosure.

Optionally, according to implementations of the disclosure, the number of transmission layers and the first SRS resource indicated by the first indication and the second SRS resource indicated by the second indication may be determined by the network device through uplink channel detection based on an SRS transmitted by the terminal device.

A brief introduction will be given below.

An SRS may be used for uplink channel information acquisition, downlink channel information acquisition, uplink beam management, etc. The network side may perform SRS management and configuration by using an SRS resource set.

For example, in terms of usage, a base station may configure one or more SRS resource sets for a UE, where each SRS resource set may have one or more SRS resources, and each SRS resource may be consist of, for example, one, two, three, four, . . . , or even more ports. Configuration information for each SRS resource set may contain a usage indication, and the usage indication may be set to, for example, "beamManagement", "codebook", "nonCode-book", or "antennaSwitching", which may be used for uplink beam management, codebook-based uplink channel information acquisition, uplink channel information acquisition for a non-codebook-based uplink transmission scheme, and SRS antenna switching-based downlink channel information acquisition.

With regard to a non-codebook-based transmission scheme mentioned above, compared with a codebook-based uplink transmission scheme, in a non-codebook-based transmission scheme, precoding is not confined to a fixed codebook-based finite candidate set, and instead, an uplink precoding matrix is determined, for example, by the UE based on channel reciprocity. If the channel reciprocity is good enough, the UE can obtain a better uplink precoding. Compared with a codebook-based transmission scheme, by means of a non-codebook-based transmission scheme, it is possible to reduce overhead of precoding indication and on the other hand, realize better performance.

An exemplary transmission procedure of a non-codebook-based uplink transmission scheme in an NR system will be given below.

Firstly, the UE may measure a downlink reference signal, obtain a candidate uplink precoding matrix, and use the candidate uplink precoding matrix to precode an SRS to be used for a non-codebook-based uplink transmission scheme, and then transmit the pre-coded SRS to the base station.

The base station can perform uplink channel detection based on the SRS transmitted by the UE, and determine, based on a result of the uplink channel detection, a corresponding SRS resource to be used for uplink transmission of the UE, a modulation and coding scheme (MCS) level for the uplink transmission, etc. to implement resource scheduling for the UE, and then notify to the UE a resource scheduling result determined. As described above, the SRS resource to be used for uplink repetitions of the UE may be indicated or notified to the UE via an SRI field.

In this way, the UE can perform data modulation and coding according to an MCS in the resource scheduling result received by the UE from the base station, determine data precoder and the number of transmission layers according to an SRI field in the resource scheduling result, and then perform uplink data transmission after data precoding.

For a non-codebook-based uplink transmission scheme, the base station may configure for the UE at least one SRS resource set used for uplink channel state information (CSI) acquisition, where each resource set may have at least one SRS resource, and each SRS resource may consist of, for example, one SRS port. The SRI field is indicative of one or more SRS resources used for determining a PUSCH precoder. The number of SRS resources indicated via the SRI field may be the number of PUSCH transmission layers, and the number of PUSCH transmission layers may be in one-to-one correspondence with the SRS resource(s) indicated via the SRI field.

For a non-codebook-based uplink transmission scheme, the UE can obtain, according to a downlink reference signal, uplink precoding information based on channel reciprocity. The UE may be configured with multiple downlink reference signals which may be used for beam management, downlink CSI measurement, and downlink channel demodulation. In order for the UE to obtain a better candidate precoder for a non-codebook-based uplink transmission scheme, in an NR system, the base station is allowed to configure, for each SRS resource set used for a non-codebook-based uplink transmission scheme, an associated non-zero power (NZP) CSI-reference signal (CSI-RS) resource used for channel measurement. Based on the associated NZP CSI-RS resource, the UE may calculate a precoder used for SRS transmission on the SRS resource set used for a non-codebook-based uplink transmission scheme. If the SRS resource set used for a non-codebook-based uplink transmission scheme is aperiodic, in order to ensure that the terminal can use the associated NZP CSI-RS resource to determine a processing time required for transmitting a precoded SRS, a gap between the last symbol for transmission of the associated NZP CSI-RS resource used for calculating the SRS precoder and the first symbol for SRS transmission shall not be less than 42 orthogonal frequency division multiplexing (OFDM) symbols. In order to reduce complexity in storage and processing of the terminal and reduce delay between SRS transmission and SRS triggering as much as possible, it is specified in an NR system that an associated aperiodic NZP CSI-RS is transmitted in a slot in which the SRS resource set is triggered.

An exemplary transmission procedure of a non-codebook-based uplink transmission scheme in an NR system is given above, but the disclosure is not limited thereto, and other proper transmission procedures may also be adopted.

Optionally, according to implementations of the disclosure, the first indication and the second indication may be contained in the same PDCCH or different PDCCHs.

If the first indication and the second indication are contained in the same PDCCH, it is convenient for the terminal device to obtain information required regarding the number of transmission layers and the SRS resource, and the number of bits can be saved and resource utilization can be improved. On the other hand, if the first indication and the second indication are contained in different PDCCHs, data can be transmitted at any time, which improves flexibility.

Optionally, according to implementations of the disclosure, the first indication and the second indication may be respectively contained in different SRI fields in the same PDCCH, or the first indication and the second indication may be contained in the same SRI field in the same PDCCH.

In implementations of the disclosure, the first indication and the second indication may be located in the same SRI field in the same PDCCH, or may be located in different SRI fields in the same PDCCH, and the disclosure is not limited in this regard.

In order for better understanding, FIG. 6 illustrates a PDCCH structure used for uplink repetitions for a single TRP in the related art, and FIG. 7, FIG. 8, and FIG. 9 each illustrate a PDCCH structure according to an exemplary implementation of the disclosure.

As illustrated in FIG. 6, in the related art, each PDCCH used for uplink repetitions for a single TRP contains one SRI field (a unique SRI) which is indicative the number of transmission layers and an SRS resource required for each transmission in the uplink repetitions.

In the PDCCH structure illustrated in FIG. 7, the first indication and/or the at least one second indication may be contained in one PDCCH, that is, the PDCCH may contain the first indication or the at least one second indication, or may contain the first indication and one or more second indications.

In the PDCCH structure illustrated in FIG. 8, the first indication and the second indication are separately located in different PDCCHs. For the case of multiple second indications, the multiple second indications may also be separately located in different PDCCHs. For example, one PDCCH may contain one second indication, or the multiple second indications may be located in one PDCCH together.

In the PDCCH structure illustrated in FIG. 9, one PDCCH may contain one SRI field (as illustrated in the upper part of FIG. 9), or may contain multiple SRI fields (as illustrated in the lower part of FIG. 9). In other words, the first indication and the at least one second indication may all be contained in one SRI field in the PDCCH, or may each be separately contained in one SRI field.

The figures above illustrate some examples, which however do not refer to all the PDCCH structures supported according to the disclosure. Actually, there is no limitation on the manner in which the first indication and the second indication are located in the PDCCH in the disclosure.

Optionally, the number of bits of the first indication (that is, the quantity of bits occupied by the first indication) may be determined according to: the pre-defined number of transmission layers or the number of transmission layers to be used for the first transmission, and at least one of the number of SRS resources in the first SRS resource set or the number of SRS resources in the second SRS resource set.

Optionally, the number of bits of the second indication may be determined according to: the pre-defined number of transmission layers or the number of transmission layers to be used for the second transmission, and at least one of the number of SRS resources in the first SRS resource set or the number of SRS resources in the second SRS resource set.

In the disclosure, the number of bits of the first indication and the number of bits of the second indication may be determined according to both the pre-defined number of transmission layers and the number of SRS resources, or may be determined according to both the number of transmission layers to be used for a corresponding transmission and the number of SRS resources, which may specifically include, for example, the following cases: the number of transmission layers (the pre-defined number of transmission layers or the number of transmission layers to be used for the corresponding transmission) and the number of SRS resources in the first SRS resource set; the number of transmission layers (the pre-defined number of transmission layers or the number of transmission layers to be used for the corresponding transmission) and the number of SRS resources in the second SRS resource set; the number of transmission layers (the pre-defined number of transmission layers or the number of transmission layers to be used for the corresponding transmission) and the number of SRS resources in the first SRS resource set as well as the number of SRS resources in the second SRS resource set; etc.

Although several implementations of determining the number of bits of the first indication are provided above, the disclosure is not limited thereto, and the number of bits of the first indication may also be determined in other manners.

As can be seen, the first indication may contain an indication of the number of transmission layers and an indication of the first SRS resource. For the case where the second indication merely indicates the second SRS resource, an information amount of the first indication is likely to be larger than that of the second indication, and accordingly, the number of bits of the first indication is likely to be greater than that of the second indication.

In order for better understanding, an example will be given below to describe in further detail how to determine the number of bits of the first indication.

With regard to an SRI in a downlink control channel, the downlink control channel carries downlink control information (DCI) to be sent to the UE by the base station. For example, an SRI field may be set in the DCI to indicate the number of transmission layers and an SRS resource selected for uplink transmission of the UE. Since one SRS resource can be indicative of one transmission layer in non-codebook-based transmission, for the case of non-codebook-based transmission, the network side can perform uplink channel detection based on an SRS transmitted by the UE as described above, so as to select one or more SRS resources and indicate the one or more SRS resources to the UE via the SRI field. As described above, the first indication may be located in the SRI field.

For example, the number of bits occupied by the first indication may be expressed, for example, by formula (1) below:

$$\left\lceil \log_2\left( \sum_{k=1}^{min\{L_{max}, N_{SRS1}\}} \binom{N_{SRS1}}{k} \right) \right\rceil \tag{1}$$

$N_{SRS1}$ is the number of SRS resources in the first SRS resource set, and $L_{max}$ is the pre-defined number of transmission layers. In other words, when the first indication indicates that the terminal device can use one transmission layer, there are $N_{SRS}$ possibilities; when the first indication indicates that the terminal device can use two transmission layers, there are $C_N^2$ possibilities; . . . ; and so forth until when the first indication indicates that the terminal device can use the maximum number of transmission layers (for example, the minimum between the pre-defined number of transmission layers $L_{max}$ and the number of SRS resources in the first SRS resource set $N_{SRS1}$), there are a certain number of possibilities.

More specifically, for example, if an SRS resource set has four SRS resources, there are four ($C_4^1$) possibilities when indicating one transmission layer (one transmission layer corresponds to one SRS resource, that is, one SRS resource is selected from the resource set), there are six ($C_4^2$) possibilities when indicating two transmission layers, there are four ($C_4^3$) possibilities when indicating three transmission layers, and there is one ($C_4^4$) possibility when indicating four transmission layers.

If the current pre-defined number of transmission layers (namely, $L_{max}$) is two, there are $C_4^1 + C_4^2 = 4 + 6$ (that is, 10) possibilities in total. In this way, since 10 is less than or equal to 16 possibilities that can be expressed by 4 bits and greater than 8 possibilities that can be expressed by 3 bits, the first indication may use 4 bits to indicate the number of transmission layers and the first SRS resource.

The above merely provides an example of determining the number of bits of the first indication. Actually, as described above, besides the implementations and specific examples thereof described above, the number of bits of the first indication may also be determined in various other manners. For example, the number of bits of the first indication may also be determined based on the number of the SRS resources in the first SRS resource set and the rule that the number of the transmission layers indicated by the first indication is equal to the determined number (that is, quantity) of the first SRS resource, thereby saving the number of bits occupied by the first indication. A specific example thereof will be given below.

In addition, regarding the number of bits of the second indication, if the second indication contains the indication of the number of transmission layers to be used for the second transmission, the number of bits of the second indication may be determined in a manner similar to those of determining the number of bits of the first indication. However, if the second indication does not contain the indication of the number of transmission layers to be used for the second transmission, the number of bits of the second indication may be determined in a manner different from those of determining the number of bits of the first indication. The following will give more specific explanations and elaborations.

Optionally, a bit value of the first indication may be determined according to a first correspondence, where the first correspondence is a correspondence between an SRS resource in the first SRS resource set and a first set of bit values.

Optionally, a bit value of the second indication may be determined according to a second correspondence, where the second correspondence is a correspondence between an SRS resource in the second SRS resource set and a second set of bit values.

In implementations of the disclosure, a correspondence may be established between a set of bit values and the SRS resource in the first SRS resource set according to the first correspondence. As such, each time the network device determines the first indication, a suitable bit value may be selected from the set of bit values as the current bit value of the first indication and sent to the terminal device.

In addition, the first correspondence may be saved at both the network-device side and the terminal-device side, which facilitates selection by the network device, and on the other hand, facilitates decoding of the first indication by the terminal device based on the first correspondence.

Optionally, the terminal device may determine, according to the first correspondence, the number of transmission layers and/or the first SRS resource indicated by the first indication.

Optionally, the terminal device may determine, according to the number of transmission layers indicated by the first indication and the second correspondence, the second SRS resource indicated by the second indication.

For example, the terminal device may determine, according to the number of transmission layers indicated by the first indication (for example, according to a specific relationship between the number of transmission layers indicated by the first indication and the number, i.e. quantity, of the second SRS resource), the number of the second SRS resource to be used by the terminal device. Then the terminal device may determine, according to the second indication (for example, according to the second correspondence), the second SRS resource to be used by the terminal device.

In implementations of the disclosure, firstly the number of the second SRS resource to be used may be determined according to the number of transmission layers indicated by the first indication, and then the second SRS resource to be used by the terminal device may be determined according to the second indication. For example, the number of transmission layers may be equal to the number of the first SRS resource/the number of the second SRS resource, where the number of the second SRS resource is equal to the number of the first SRS resource. As such, the second indication does not have to indicate the number of the second SRS resource and only needs to indicate a specific SRS resource to be used (which may be indicated by, for example, a resource identity (ID), a resource index, or other forms of indication codes, etc.). In this way, it is possible to at least save the number of bits of the second indication and thus improve coding rate and resource utilization.

As described above, the first correspondence indicates how the first set of bit values corresponds to the SRS resource(s). In this way, for the first transmission, the terminal device can determine, according to the bit value of the first indication received, the first SRS resource to be used, for example, which first SRS resource(s) to be used. In addition, how many first SRS resource(s) is available for the first transmission can be determined according to an explicit indication via the bit value of the first indication; or although not explicitly indicated by the first indication, how many first SRS resource(s) is available can be calculated by the terminal device itself according to the first SRS resource(s) to be used. Here, how many first SRS resource(s) to be used is determined in order to determine the number of transmission layers to be used, because one transmission layer may correspond to one SRS resource. Thus, after how many first SRS resource(s) to be used is determined according to the first indication, the number of transmission layers to be used can be determined because the two are equal. In order for clarity and better understanding of implementations of the disclosure, more specific examples will be given below.

As such, in the first indication, there is no need to use a specific number of bits to separately indicate the number of transmission layers and/or the number of SRS resources to be used, and instead, the number of transmission layers and/or the number of SRS resources to be used can be jointly indicated, thereby greatly saving the number of bits of the first indication and improving resource utilization.

According to implementations of the disclosure, the bit value of the second indication may be determined according to a correspondence (the second correspondence) between the SRS resource in the second SRS resource set and the second set of bit values.

In implementations of the disclosure, a correspondence (the second correspondence) between another set of bit values (namely, the second set of bit values) and the SRS resource in the second SRS resource set may be defined to determine the bit value of the second indication. Similarly, the second correspondence may be saved at both the network-device side and the terminal-device side, which facilitates selection by the network device, and on the other hand, facilitates decoding of the second indication by the terminal device.

Optionally, according to implementations of the disclosure, for the second transmission, the terminal device may determine, according to the number of transmission layers indicated by the second indication and the second correspondence, the second SRS resource indicated by the second indication, which may be similar to the foregoing elaboration regarding the first transmission and thus will not be elaborated again herein.

Optionally, according to implementations of the disclosure, the terminal device may determine, according to the number of transmission layers indicated by the first indication and the second correspondence, the second SRS resource indicated by the second indication.

In implementations of the disclosure, since the second indication may only indicate the second SRS resource without indicating the number of transmission layers, the second correspondence may be different from the first correspondence, that is, more bits may be saved in the second indication, thereby improving resource utilization for technical solutions of implementations of the disclosure.

Optionally, according to implementations of the disclosure, if the number of SRS resources in the first SRS resource set is one, the number of bits of the first indication may be one.

Similarly, if the number of SRS resources in the second SRS resource set is one, the number of bits of the second indication may be one.

In implementations of the disclosure, if the number of SRS resources in an SRS resource set is one, the number of bits of a corresponding indication may be one. For example, the value of the bit may be set to "1" to indicate that the terminal device can use the only one SRS resource to perform a corresponding uplink transmission, and the number of transmission layers to be used is also one. Actually, if the number of SRS resources in the SRS resource set is one, the value of the one bit in the corresponding indication may also be set to "0" to indicate that the terminal device can use the only one SRS resource to perform the corresponding uplink transmission, and the number of transmission layers to be used is also one, as long as the network device and the terminal device both know the meaning of the bit value.

It should be noted that, although each time the number of the first SRS resource indicated by the first indication is equal to the number of the second SRS resource indicated by the second indication (which are equal to the number of transmission layers indicated by the first indication), this does not mean that there is no need to determine the second indication, because for the case of uplink repetitions for multiple receivers and/or multiple beam directions, the second indication is still needed for indicating which SRS resource(s) (namely, the second SRS resource(s)) is to be used for the uplink repetitions of the terminal device.

For the case where the number of SRS resources in the second SRS resource set is one, if the second indication is not determined and sent, the transmission may be considered to be transmission for a single receiver and/or a single beam direction. Therefore, in order to indicate that the transmission is a multi-beam transmission, the second indication may be set to have one bit to indicate "transmission for multiple receivers and/or multiple beam directions".

Similarly, if the number of SRS resources in the first SRS resource set is one, if the first indication is not determined and sent, it may be considered that the network side did not respond to the uplink repetitions of the terminal device (no indication of the number of transmission layers and no indication of the first SRS resource). Therefore, the first indication may be set to have one bit in order for an explicit response.

Optionally, if the second indication does not contain the indication of the number of transmission layers to be used for the second transmission, the number of bits of the second indication may be determined according to the number of transmission layers indicated by the first indication and the number of SRS resources in the second SRS resource set.

In the implementation above, the number of bits of the first indication may be determined according to the number of transmission layers and the number of SRS resources in the first SRS resource set indicated by the first indication. However, with regard to the second indication, it does not need to indicate the number of transmission layers because the number of transmission layers indicated by the first indication can also be applied to a transmission corresponding to the second indication. Therefore, the number of bits of the second indication can be determined according to the number of transmission layers indicated by the first indication and the number of SRS resources in the second SRS resource set.

Optionally, the number of bits of the second indication is determined according to a maximum among numbers of bits that are determined according to different numbers of transmission layers and the number of SRS resources in the second SRS resource set, and each of the different numbers of transmission layers does not exceed the pre-defined number of transmission layers.

Considering that the second indication may not indicate the number of transmission layers, determination of the number of bits of the second indication may be simplified accordingly. In addition, if a different number of bits is used each time for the second indication, it will bring burden in both encoding at the network-device side and decoding at the terminal-device side. Therefore, in the implementation of the disclosure, a fixed number of bits can be used for the second indication, which can relax encoding burden at the network-device side and decoding burden at the terminal device-side, and on the other hand, reduce bit error rate (BER).

If the fixed number of bits is to be used, respective number of bits can be determined according to the different numbers of transmission layers and the number of SRS resources in the second SRS resource set, and then the maximum among these numbers of bits is selected as the fixed number of bits.

Optionally, according to implementations of the disclosure, the pre-defined number of transmission layers, the number of SRS resources in the first SRS resource set, and the number of SRS resources in the second SRS resource set can be updated.

In other words, these values may not always be specific values and may be updated according to actual situations or needs. The updating occasion may be on-demand updating, triggered updating (for example, based on some triggering conditions), or regular updating, which is conducive to flexibility and convenience of solutions of the disclosure.

Optionally, the uplink repetitions of the terminal device are intended for multiple receivers and/or different beam directions, or the uplink repetitions of the terminal device are intended for a single receiver and/or a single beam direction.

Whether the uplink repetitions of the terminal device are intended for multiple receivers and/or different beam directions or are intended for a single receiver and/or a single beam direction may be determined by the network device or by the terminal device, and the disclosure is not limited in this regard.

As described above, according to the disclosure, not only uplink repetitions for multiple receivers and/or multiple beam directions but also uplink repetitions for a single receiver and/or a single beam direction are supported, which is high in compatibility of the disclosure and conducive to flexibility and convenience in application.

Optionally, the SRI information including the first indication and/or the at least one second indication specifically includes: the SRI information includes the first indication, and the uplink repetitions of the terminal device are intended for a single receiver and/or a single beam direction.

Optionally, according to implementations of the disclosure, in response to determining that the uplink repetitions of the terminal device use a single receiver and/or a single beam direction, it is only required to determine and send the first indication without determining and sending the second indication.

In implementations of the disclosure, in case of determining that the uplink repetitions of the terminal device is intended for a single receiver and/or a single beam direction, it is only required to determine the first indication and send the first indication without determining and sending the second indication, that is, the first indication determined and sent is the SRI information to be used for the uplink repetitions. As such, it is possible to realize compatibility of the disclosure with regard to uplink repetitions for a single receiver and/or a single beam direction. In addition, since it is unnecessary to determine and send the second indication, it is possible to save processing resources and the number of bits, thereby improving resource utilization.

In addition, if the uplink repetitions are intended for multiple receivers but a single beam direction, the SRI information may include the first indication and the second indication.

Figure 10:
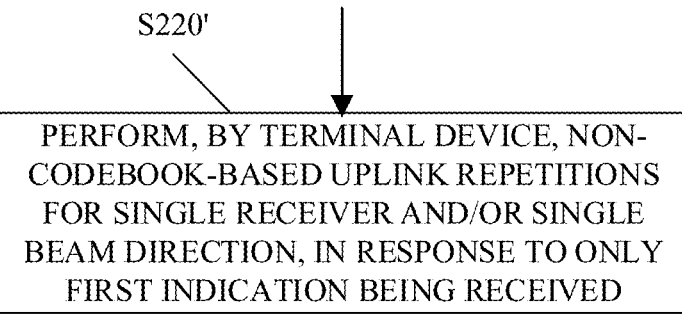
FIG. 10 is a schematic flowchart illustrating determining to perform uplink repetitions for a single receiver and/or a single beam direction in the transmission method according to another implementation of the disclosure.

Optionally, as illustrated in FIG. 10, according to implementations of the disclosure, the method may further include the following.

S220', in response to only the first indication being received, the terminal device performs non-codebook-based uplink repetitions for a single receiver and/or a single beam direction.

In other words, after receiving the SRI information, the terminal device decodes the SRI information, and if a decoding result is that there is only the first indication and no second indication, the terminal device determines that the terminal device is to perform uplink repetitions for a single receiver and/or a single beam direction.

Optionally, as described above, the receiver may include a TRP. In addition, the receiver may also include a receiver other than a TRP.

The method according to the disclosure is described above. By means of the method of the disclosure, a payload of a PDCCH occupied can be made as less as possible when indicating an SRS resource to be used for uplink PUSCH transmission of the terminal device, thereby improving coding rate and resource utilization.

In the disclosure, at least a scheme for indicating an SRS resource to be used by the terminal device in a scenario where the terminal device needs to transmit the same PUSCH to multiple receivers is provided, thereby at least realizing support of uplink repetitions for multiple receivers.

In order for better understanding of the disclosure, a detailed illustration will be given below with reference to some examples.

Example 1

FIG. 11 is a flowchart illustrating an example of the transmission method according the disclosure. As illustrated in FIG. 11, the example of the method may include the following steps and/or operations.

Step S1001, the network device configures uplink repetitions of the terminal device to be non-codebook-based transmission, and configures a resource set required for the uplink repetitions and sets the pre-defined number of transmission layers.

In this example, the network device may configure two SRS resource sets for the terminal device, where the two SRS resource sets are both used for the non-codebook-based transmission. In addition, the first SRS resource set, for example, has four SRS resources, namely SRS resource 0, SRS resource 1, SRS resource 2, and SRS resource 3; and the second SRS resource set, for example, also has four SRS resources, namely SRS resource 4, SRS resource 5, SRS resource 6, and SRS resource 7.

For example, the pre-defined number of transmission layers is set to four, which means that when determining the SRI information (for example, including the first indication and the second indication) for the uplink transmission of the terminal device, the network device can select at most four SRS resources from each SRS resource set. Since the method for determining the pre-defined number of transmission layers has been described above, the details thereof will not be described again herein.

Step S1002, the terminal device measures an NZP CSI-RS associated with each SRS resource set to obtain a candidate uplink precoding matrix, and precodes each SRS resource in a corresponding SRS resource set based on the candidate uplink precoding matrix and then transmits the SRS resource to the network device (such as base station).

In step S1002, the terminal device transmits to the network device a signal (namely, SRS) associated with each SRS resource in the corresponding SRS resource set configured by the network device, so that the network device can detect these signals (in step S1003) to select a suitable SRS resource(s) in order for the terminal device to perform a corresponding uplink transmission.

Step S1003, the network device performs uplink channel detection based on the SRS transmitted by the terminal device, and determines a precoding matrix that is to be used by the terminal device for the uplink repetitions.

Here, the network device may select the same number of resources from each SRS resource set, because for uplink repetitions, the number of transmission layers for each transmission (such as the first transmission or the second transmission described above) for each receiver and/or each beam direction is the same and one transmission layer corresponds to one SRS resource.

Step S1004, the network device determines the SRI information including the first indication and the second indication, that is, determines the number of bits and the bit value of the first indication and the number of bits and the bit value of the second indication, and sends the SRI information to the terminal device on a PDCCH.

Specifically, in this example, it may be determined that the number of transmission layers to be used by the terminal device is one. Since the number of transmission layers is one, one SRS resource can be selected from the first SRS resource set as the first SRS resource, and one SRS resource can be selected from the second SRS resource set as the second SRS resource.

In this example, suppose that according to a detection result in step S1003, SRS resource 0 is selected from the first SRS resource set as the unique first SRS resource indicated by the first indication.

In this case, the network device may determine the number of bits of the first indication in the manner described above. Here, the number of bits of the first indication is determined exemplarily according to the pre-defined number of transmission layers and the number of SRS resources in the first SRS resource set.

Specifically, since the pre-defined number of transmission layers is four, it is necessary to determine the number (i.e. quantity) of possibilities of selecting one SRS resource from the four SRS resources in the first SRS resource set, the number of possibilities of selecting two SRS resources from the four SRS resources in the first SRS resource set, the number of possibilities of selecting three SRS resources from the four SRS resources in the first SRS resource set, and the number of possibilities of selecting four SRS resources from the four SRS resources in the first SRS resource set, and then add these numbers of possibilities to determine the number of bits. That is, there are four possibilities when selecting one SRS resource from the four SRS resources in the first SRS resource set, i. e. $C_4^1=4$; there are six possibilities when selecting two SRS resources from the four SRS resources in the first SRS resource set, i. e. $C_4^2=6$; there are four possibilities when selecting three SRS resources from the four SRS resources in the first SRS resource set, i. e. $C_4^3=4$; and there is one possibility when selecting four SRS resources from the four SRS resources in the first SRS resource set, i. e., $C_4^4=1$, and accordingly, there are 4+6+4+1=15 possibilities in total. Therefore, the number of bits of the first indication may be four, that is, the number of transmission layers (as described above, the number of transmission layers to be used for the uplink repetitions of the terminal device is one) and the first SRS resource to be used may be indicated via the four bits in the first indication, and therefore, the number of bits of the first indication may be four. Regarding how to indicate the number of transmission layers and the first SRS resource to be used (namely, determine the bit value of the first indication) via the bits in the first indication, a more specific example will be given below to facilitate understanding.

In addition, in order for better understanding of the disclosure, the following will further exemplify how to determine the number of bits of the first indication according to the pre-defined number of transmission layers and the number of SRS resources in the first SRS resource set when the pre-defined number of transmission layers is two. Specifically, the number of possibilities when selecting one SRS resource from the four SRS resources in the first SRS resource set and the number of possibilities when selecting two SRS resources from the four SRS resources in the first SRS resource set may be determined, and then the two numbers of possibilities may be added to determine the number of bits. That is, determine that there are four possibilities when selecting one SRS resource from the four SRS resources in the first SRS resource set, i. e. $C_4^1=4$, and that there are six possibilities when selecting two SRS resources from the four SRS resources in the first SRS resource set, i. e. $C_4^2=6$, and accordingly, there are 4+6=10 possibilities in total. Therefore, the number of bits of the first indication may be four. Via the four bits in the first indication, the number of transmission layers (the number of transmission layers to be used for the uplink repetitions of the terminal device is one) and the first SRS resource to be used can be indicated.

Since the first indication already indicates that the number of transmission layers to be used for the current uplink repetitions is one (a specific example thereof will be given below), the second indication is only required to indicate the second SRS resource to be used by the terminal device for the second transmission. Regarding the number of bits of the second indication, the number of bits of the second indication may also be determined in the manner described above. Here, the number of bits of the second indication is determined exemplarily according to the number of transmission layers indicated by the first indication and the number of SRS resources in the second SRS resource set.

Specifically, there are four possibilities when selecting one SRS resource from the four SRS resources in the second SRS resource set, i. e. $C_4^1=4$, and therefore, the number of bits of the second indication may be two. Via the two bits in the second indication, the second SRS resource to be used can be indicated (in this example, the number of the second SRS resource is one because the number of transmission layers is one). Regarding how to indicate the second SRS resource to be used (namely, determine the bit value of the second indication) via the bit value of the second indication, a more specific example thereof will be given below to facilitate understanding.

In addition, the SRI information (e. g. the SRI field) including the first indication and the second indication may be sent to the terminal device on a PDCCH.

Step S1005, the terminal device performs blind detection on the PDCCH transmitted by the network device, determines resource indication information indicated by the first indication and the second indication in the PDCCH, such as the number of transmission layers and/or the SRS resource, and performs PUSCH repetition based on the resource indication information determined.

Specifically, decoding of the bits in the first indication and the bits in the second indication by the terminal device corresponds to the meaning in determining the bit value of the first indication and the meaning of the bit value of the second indication by the network device.

The following will firstly exemplify how the network device (at the network side) determines the bit value of the first indication and the bit value of the second indication (step S1004).

In this example, the bit value of the first indication may be determined according to the correspondence (the first correspondence) between the SRS resource in the first SRS resource set and the first set of bit values. Similarly, the bit value of the second indication may be determined according to the correspondence (the second correspondence) between the SRS resource in the second SRS resource set and the second set of bit values. That is, the first indication and the second indication are encoded.

For ease of understanding, the following will give a more detailed illustration in the form of table. However, it should be noted that, the illustration given below is only exemplary, and shall not be construed as limitation on the disclosure.

Suppose that two SRS resource sets, namely resource set 0 (the first resource set) and resource set 1 (the second resource set), are configured by the network device, where the two SRS resource sets are both used for non-codebook-based transmission; resource set 0 corresponds to a first beam (suppose that the first beam corresponds to a first TRP such as TRP 0), and resource set 1 corresponds to a second beam (suppose that the second beam corresponds to a second TRP such as TRP 1); and the pre-defined number of transmission layers is determined (or set) to be four in the manner described above.

Table 1 below gives detailed information of SRS resource set 0 and resource set 1. For example, SRS resource set 0 has SRS resource 0, SRS resource 1, SRS resource 2, and SRS resource 3; and SRS resource set 1 has SRS resource 5, SRS resource 8, SRS resource 9, and SRS resource 10.

TABLE 1

| SRS resource set 0 | SRS resource set 1 |
| --- | --- |
| SRS resource 0 | SRS resource 5 |
| SRS resource 1 | SRS resource 8 |
| SRS resource 2 | SRS resource 9 |
| SRS resource 3 | SRS resource 10 |

As described above, as to uplink transmission for the first beam (uplink transmission for TRP 0), the number of bits to be occupied by the first indication can be determined according to the pre-defined number of transmission layers (i.e. four) and the number of SRS resources in the first SRS resource set (i.e. four). Specifically, there are four possibilities when selecting one SRS resource from the four SRS resources in the first SRS resource set, i. e. $C_4^1=4$; there are six possibilities when selecting two SRS resources from the four SRS resources in the first SRS resource set, i. e. $C_4^2=6$; there are four possibilities when selecting three SRS resources from the four SRS resources in the first SRS resource set, i. e. $C_4^3=4$; and there is one possibility when selecting four SRS resources from the four SRS resources in the first SRS resource set, i. e. $C_4^4=1$, and accordingly, there are 4+6+4+1=15 possibilities in total. Therefore, the number of bits of the first indication may be four, that is, the number of transmission layers and the first SRS resource to be used may be indicated via the four bits in the first indication. The following will exemplify in the form of table how to indicate, via the bits in the first indication, the number of transmission layers and the first SRS resource to be used.

Table 2 below gives a specific example of the first correspondence. In Table 2, bit values "0000", "0001", . . . , "1110" in the first set of bit values are in one-to-one correspondence with the first SRS resource indicated by the bit values.

TABLE 2

| First correspondence | |
| --- | --- |
| Bit value | First SRS resource indicated |
| 0000 | SRS resource 0 |
| 0001 | SRS resource 1 |
| 0010 | SRS resource 2 |
| 0011 | SRS resource 3 |
| 0100 | SRS resources 0, 1 |
| 0101 | SRS resources 0, 2 |
| 0110 | SRS resources 0, 3 |
| 0111 | SRS resources 1, 2 |
| 1000 | SRS resources 1, 3 |
| 1001 | SRS resources 2, 3 |
| 1010 | SRS resources 0, 1, 2 |
| 1011 | SRS resources 0, 1, 3 |
| 1100 | SRS resources 0, 2, 3 |
| 1101 | SRS resources 1, 2, 3 |
| 1110 | SRS resources 0, 1, 2, 3 |

As can be seen from table 2, if the number of the first SRS resource to be indicated by the first indication is one, the bit value of the first indication is one of "0001", "0001", "0010", or "0011". If the number of the first SRS resource to be indicated by the first indication is two, the bit value of the first indication is one of "0100", "0101", "0110", "0111", "1000", or "1001". If the number of the first SRS resource to be indicated by the first indication is three, the bit value of the first indication is one of "1010", "1011", "1100", or "1101". If the number of the first SRS resource to be indicated by the first indication is four, the bit value of the first indication is "1110".

Supposing that the network device determines that the number of transmission layers to be used for the uplink repetitions of the terminal device is one and determines, through channel detection, that SRS resource 1 among the four SRS resources in the first SRS resource set is the first SRS resource to be used for the first transmission of the terminal device, it can be determined that the bit value of the first indication is "0001" (the number of transmission layers to be used by the terminal device is one, and the first SRS resource includes only SRS resource 1).

In addition, the number of bits of the second indication may be determined according to the number of transmission layers to be used and the number of SRS resources in the second SRS resource set. Specifically, since it is already determined that the number of transmission layers to be used is one and the number of SRS resources in SRS resource set 1 is four, there are four possibilities when selecting one SRS resource from the four SRS resources, i. e. $C_4^1=4$, and accordingly, the number of bits of the second indication is two. As can be seen, although the second SRS resource set has four SRS resources like the first SRS resource set, the number of bits of the second indication is greatly reduced compared with the number of bits of the first indication, thereby reducing a payload of the PDCCH and thus improving coding rate and resource utilization.

With regard to the second correspondence, since it is already determined that the number of transmission layers to be used is one, the number of the second SRS resource to be used is one accordingly. Each two-bit value (i. e. each bit value of two bits) in the second set of bit values may similarly represent a single SRS resource in SRS resource set 1. In this way, it is possible to realize one-to-one correspondence between bit values in the second set of bit values and the second SRS resource indicated by the bit values. In the second correspondence shown in table 3 below, only a correspondence between bit values and single SRS resources is present without presence of combination of SRS resources. As shown in table 3, the second set of bit values "00", "01", "10", and "11" and the single SRS resources (the second SRS resource indicated) in SRS resource set 1 are in a correspondence.

TABLE 3

| Second correspondence | |
|---|---|
| Bit value | Second SRS resource indicated |
| 00 | SRS resource 5 |
| 01 | SRS resource 8 |
| 10 | SRS resource 9 |
| 11 | SRS resource 10 |

Supposing that the network device determines, through channel detection, that SRS resource 8 among the four SRS resources in the second SRS resource set is the second SRS resource to be used by the terminal device for the second transmission, it can be determined that the bit value of the second indication is "01" (the second SRS resource includes only SRS resource 8).

As such, the bit value of the first indication and the bit value of the second indication can be determined.

As described above, the disclosure is not limited to the example above, and instead, the bit value of the first indication and the bit value of the second indication can also be determined in other manners.

Example 2

Steps in this example are similar to those in example 1 but somewhat different in parameter and method, and therefore will be described like the steps in example 1.

Step S1001, the network device configures uplink transmission of the terminal device to be non-codebook-based transmission, and configures two SRS resource sets for the uplink repetitions of the terminal device. SRS resource set 0 has four SRS resources, namely SRS resource 0, SRS resource 1, SRS resource 2, and SRS resource 3; and unlike example 1, SRS resource set 1 has two SRS resources, namely SRS resource 5 and SRS resource 8. In addition, it is determined that the pre-defined number of transmission layers is three, that is, the network device indicates that the number of transmission layers to be used by the terminal device for the uplink repetitions is at most three, and at most three SRS resources can be selected from each resource set for use.

Step S1002 and step S1003 are similar to those in example 1, and therefore will not be elaborated again herein.

Step S1004, the network device determines the SRI information including the first indication and the second indication, i. e. determines the number of bits and the bit value of the first indication and the number of bits and the bit value of the second indication, and sends the the SRI information to the terminal device on a PDCCH.

Supposing that the network device determines that the number of transmission layers to be used by the terminal device is two and determines, through channel detection in step S1003, that SRS resource 0 and resource 2 are selected from SRS resource set 0 as the first SRS resource, that is, the first SRS resource includes SRS resource 0 and SRS resource 2, the network device may determine the number of bits of the first indication according to the determined number of transmission layers to be used (taken as the number of transmission layers indicated by the first indication) and the number of SRS resources in the first SRS resource set, which is different from example 1.

Since SRS resource set 0 has four SRS resources and the number of transmission layers to be used is two, there are four possibilities when selecting one SRS resource from SRS resource set 0 ($C_4^1$), and there are six possibilities when selecting two SRS resources from SRS resource set 0 ($C_4^2$), and accordingly, there are $C_4^1+C_4^2=4+6$ (that is, 10) possibilities in total. In this way, since 10 less than or equal to 16 possibilities that can be expressed by 4 bits and greater than 8 possibilities that can be expressed by 3 bits, the first indication may use 4 bits to indicate the number of transmission layers and the first SRS resource.

Table 4 below shows the first correspondence between the first set of bit values and the SRS resource in the first SRS resource set. Since the number of bits of the first indication is determined according to the determined number of transmission layers to be used (i.e. two) (taken as the number of transmission layers indicated by the first indication) and the number of SRS resources in the first SRS resource set (i.e. four), the table only shows ten sets of values (a correspondence between bit values and single SRS resources as well as combinations of two SRS resources), without showing a correspondence between bit values and combinations of three SRS resources as well as a combination of 4 SRS resources.

Here, if the number of bits of the first indication is determined according to the pre-defined number of transmission layers (i.e. three) and the number of SRS resources in the first SRS resource set (i.e. four), the determined number of bits of the first indication is also four. However, in the first correspondence for this case, the first SRS resource indicated may also include three SRS resources. In addition, if the pre-defined number of transmission layers is set to four like example 1, when determining the number of bits of the first indication according to the pre-defined number of transmission layers (i.e. four) and the number of SRS resources in the first SRS resource set (i.e. four), the determined number of bits of the first indication is also four. However, in the first correspondence for this case, the first SRS resource indicated may also include four SRS resources, as shown in table 2.

TABLE 4

| First correspondence | |
|---|---|
| Bit value | First SRS resource indicated |
| 0000 | SRS resource 0 |
| 0001 | SRS resource 1 |
| 0010 | SRS resource 2 |
| 0011 | SRS resource 3 |
| 0100 | SRS resources 0, 1 |
| 0101 | SRS resources 0, 2 |
| 0110 | SRS resources 0, 3 |
| 0111 | SRS resources 1, 2 |
| 1000 | SRS resources 1, 3 |
| 1001 | SRS resources 2, 3 |

Since the network device determines that the number of transmission layers to be used for the uplink repetitions of the terminal device is two, suppose that it is determined, through channel detection, that SRS resource 0 and SRS resource 1 among the four SRS resources in the first SRS resource set are the first SRS resource to be used for the first transmission of the terminal device, it can be determined that the bit value of the first indication is "0100" (the number of transmission layers to be used by the terminal device is two, and the first SRS resource includes SRS resource 0 and SRS resource 1).

Since it is determined that the number of transmission layers to be used is two, the number of the second SRS resource to be used is two accordingly. Therefore, the number of bits of the second indication can be determined according to the number of transmission layers to be used (i.e. two) and the number of SRS resources in the second SRS resource set. For example, the number of possibilities when selecting two SRS resources from the two SRS resources in SRS resource set 1 is one, and accordingly, the number of bits of the second indication may be one.

The second correspondence given in table 5 below is a correspondence between a bit value and a combination of two SRS resources (the second SRS resource indicated). As shown in table 5, the second set of bit values "1" (the second set of bit values has only one value) and the two SRS resources (namely SRS resource 5 and SRS resource 8) in SRS resource set 1 are in a correspondence. In addition, although the bit value shown in table 5 is "1", the bit value may also be "0", as long as the meaning of the bit value is clear for both the network device and the terminal device.

As can be seen, the number of bits of the second indication is greatly reduced compared with the number of bits of the first indication, thereby reducing a payload of the PDCCH and thus improving coding rate and resource utilization.

TABLE 5

| Second correspondence | |
| --- | --- |
| Bit value | Second SRS resource indicated |
| 1 | SRS resources 5, 8 |

Since it is determined that the number of transmission layers to be used is two, the number of the second SRS resource to be used is two accordingly. Therefore, the network device may determine that both of the two SRS resources (namely SRS resource 5 and SRS resource 8) in the second SRS resource set are the second SRS resource to be used by the terminal device for the second transmission, and accordingly, it can be determined that the bit value of the second indication is one (the second SRS resource includes SRS resource 5 and SRS resource 8).

As such, the bit value of the first indication and the bit value of the second indication can be determined.

As described above, since the determined number of transmission layers to be used is two in this example, when determining the second SRS resource that is to be indicated by the second indication, the network device can only select two SRS resources from the two SRS resources in SRS resource set 1, i. e. there is only one possibility. When there is only one possibility, the bit value may not be set for indication, that is, the second indication may not be determined and sent. However, if the second indication is not determined and sent, the terminal device may misunderstand, for example, the terminal device may consider that the network device indicates that the PUSCH transmission is intended for a single receiver and/or a single beam direction (for example, one indication corresponds to one beam direction or one receiver such as TRP, and if there is no corresponding indication, it means that transmission is not needed), or may consider that the network device indicates that the PUSCH transmission is intended for multiple beam directions or multiple TRPs (MTRP), but if there is no corresponding indication, all SRS resources in a corresponding SRS resource set are to be used. Therefore, in order to avoid such misunderstandings, a one-bit value may be set for the second indication to indicate if there is only one possibility.

In addition, in order to save the number of bits of the first indication, the number of bits of the first indication may also be determined based on the number of SRS resources in the first SRS resource set as well as the rule that the number of transmission layers indicated by the first indication is equal to the determined number of the first SRS resource, which also differs from example 1.

For example, the first correspondence in table 2 may be modified into that shown in table 6 below.

TABLE 6

| First correspondence | |
| --- | --- |
| Bit value | First SRS resource (number of transmission layers) indicated |
| 00 | SRS resource 0 (1 layer) |
| 01 | SRS resource 1 (1 layer) |
| 10 | SRS resource 2 (1 layer) |
| 11 | SRS resource 3 (1 layer) |
| 000 | SRS resources 0, 1 (2 layers) |
| 001 | SRS resources 0, 2 (2 layers) |
| 010 | SRS resources 0, 3 (2 layers) |
| 011 | SRS resources 1, 2 (2 layers) |
| 100 | SRS resources 1, 3 (2 layers) |
| 101 | SRS resources 2, 3 (2 layers) |
| 1000 | SRS resources 0, 1, 2 (3 layers) |
| 1001 | SRS resources 0, 1, 3 (3 layers) |
| 1010 | SRS resources 0, 2, 3 (3 layers) |
| 1011 | SRS resources 1, 2, 3 (3 layers) |
| 1111 | SRS resources 0, 1, 2, 3 (4 layers) |

In table 6, the number of the first SRS resource indicated is the number of transmission layers to be used, for example, "00", "01", "10", and "11" each are used to indicate a single first SRS resource (a single SRS resource selected from the first SRS resource set as the first SRS resource), and in this case, only two bits are needed in the first indication. If the number of the first SRS resource is two, three bits may be used for indication. In the above two cases, a simplified method for determining the number of bits and the bit value of the first indication is generally similar to the method for determining the number of bits and the bit value of the second indication according to the number of transmission layers to be used and the number of SRS resources in the second SRS resource set. However, if the first SRS resource includes three first SRS resources, since two-bit values are already occupied for indication of single first SRS resources, three-bit values are taken into consideration to indicate the first SRS resource that includes three first SRS resources. When the first SRS resource includes four first SRS resources, since three-bit values can still be used, three-bit values may continue to be used to indicate the first SRS resource that includes four first SRS resources. For the sake of convenience, a special three-bit value, such as "111", may also be used to indicate the first SRS resource that includes four first SRS resources.

It should be noted that, the bit values given in table 6 are merely illustrative, and the disclosure shall not be limited thereto.

By comparison, it can be seen that the number of bits can be saved if a simplified indication is used, especially for the case where the number of transmission layers to be used (namely, the first SRS resource to be used) is small.

In addition, it should be noted that, regarding the first correspondence, when the first SRS resource includes three first SRS resources, since the two-bit values are already occupied to indicate single first SRS resources, the first SRS resource and the number of transmission layers to be used need to be indicated by values of other numbers of bits. However, regarding the second correspondence, two bits can be used for the case where the second SRS resource set has four SRS resources and the number of the second SRS resource to be used is three ($C_4^3=4$) (as shown in table 7 below), and the case where the second SRS resource set has four SRS resources and the number of the second SRS resource to be used is one ($C_4^1=4$) (as shown in table 8 below), as long as the second SRS resource indicated by each two-bit value is defined clearly, because the number of transmission layers to be used may be determined according to the first indication. After the number of transmission layers is determined, the second SRS resource to be used may be determined according to the second correspondence with reference to the number of transmission layers.

For example, assuming that the terminal device determines, according to the first indication, that the number of transmission layers to be used is three, the terminal device may consult table 7 to determine the second SRS resource indicated by the second indication. Similarly, assuming that the terminal device determines, according to the first indication, that the number of transmission layers to be used is one, the terminal device may consult table 8 to determine the second SRS resource indicated by the second indication.

TABLE 7

| Second correspondence | |
|---|---|
| Bit value | Second SRS resource indicated |
| 00 | SRS resources 5, 6, 7 |
| 01 | SRS resources 5, 6, 8 |
| 10 | SRS resources 6, 7, 8 |
| 11 | SRS resources 5, 7, 8 |

TABLE 8

| Second correspondence | |
|---|---|
| Bit value | Second SRS resource indicated |
| 00 | SRS resource 5 |
| 01 | SRS resource 6 |
| 10 | SRS resource 7 |
| 11 | SRS resource 8 |

Step S1005 is similar to that in example 1. The terminal device performs blind detection on the PDCCH transmitted by the network device, determines resource indication information indicated by the first indication and the second indication in the PDCCH, such as the number of transmission layers and/or the SRS resource, and performs PUSCH repetitions for multiple beams (two beams) according to the resource indication information determined, which will not be described again herein.

Example 3

Steps in this example are similar to those in example 1 but somewhat different in parameter and method, and therefore will be described like the steps in example 1.

Step S1001, the network device configures the uplink repetitions of the terminal device to be non-codebook-based transmission, and configures a resource set required for the uplink repetitions and sets the pre-defined number of transmission layers.

Specifically, in this example, the network device also configures two SRS resource sets for the terminal device, where SRS resource set 0 has four SRS resources, and SRS resource set 1 also has four SRS resources. The pre-defined number of transmission layers is determined to be four, that is, the network device indicates the terminal device to select at most four SRS resources from each resource set in order for performing uplink repetitions.

Step S1002 and step S1003 are similar to those in example 1, and therefore will not be elaborated again herein.

Step S1004, the network device determines the SRI information including the first indication and the second indication, that is, determines the number of bits and the bit value of the first indication and the number of bits and the bit value of the second indication, and sends the SRI information to the terminal device on a PDCCH.

The network device determines that the number of transmission layers to be used by the terminal device is four (equal to the pre-defined number of transmission layers (i.e. four)), and then selects all the SRS resources (i.e. SRS resource 0, SRS resource 1, SRS resource 2, and SRS resource 3) in SRS resource set 0 as the first SRS resource. In this case, the network device can determine, according to formula 1, that the number of bits of the first indication is four (the total number of all the possibilities is $C_4^1+C_4^2+C_4^3+C_4^4=15$).

As such, according to table 2, it may be determined that the bit value of the first indication is "1110".

The number of bits of the second indication may be determined according to the number of transmission layers to be used (i.e. four) and the number of SRS resources in the second SRS resource set (i.e. four). There is only one possibility when selecting four resources from four resources (assuming that the resources are SRS resource 5, SRS resource 6, SRS resource 7, and SRS resource 8), and therefore, it can be determined that the number of bits of the second indication is one. In this case, the bit value of the second indication may be "0" or "1" as shown in table 9 below.

TABLE 9

| Second correspondence | |
|---|---|
| Bit value | Second SRS resource indicated |
| 0 | SRS resources 5, 6, 7, 8 |

As described above, the number of bits of the second indication may be zero or one, and thus the number of bits can be saved. However, considering that different numbers of bits of the second indication will result in different total numbers of bits of the PDCCH which in turn will increase complexity in blind detection, a scheme of using a fixed number of bits for the second indication may also be adopted.

For example, if the second SRS resource set has four SRS resources (assuming that the SRS resources are SRS resource 5, SRS resource 6, SRS resource 7, and SRS resource 8), there are four possibilities when selecting one SRS resource as the second SRS resource, there are six possibilities when selecting two SRS resources as the second SRS resource, there are four possibilities when selecting three SRS resources as the second SRS resource, and there is one possibility when selecting four SRS resources as the second SRS resource, and the numbers of bits required for these cases are two, three, two, and zero (or one as described above) respectively. Therefore, the maximum (i. e. three) among these numbers of bits may be selected as the number of bits of the second indication.

In addition, multiple different tables regarding the second correspondence may be defined for different cases, so that the bit value of the second indication can be determined according to a corresponding table. For example, table 10 below shows the case where three bits are used to indicate the second SRS resource that includes one SRS resource. Table 11 below shows the case where three bits are used to indicate the second SRS resource that includes two SRS resources. Table 12 below shows the case where three bits are used to indicate the second SRS resource that includes three SRS resources. Table 13 below shows the case where three bits are used to indicate the second SRS resource that includes four SRS resources.

It should be noted that, the tables shown herein are merely illustrative, and shall not be construed as limitation on the disclosure. In addition, various other tables can be designed according to the technical concept of the disclosure, which shall all fall within the protection scope of the disclosure.

TABLE 10

| Second correspondence | |
| --- | --- |
| Bit value | Second SRS resource indicated |
| 000 | SRS resource 5 |
| 001 | SRS resource 6 |
| 010 | SRS resource 7 |
| 011 | SRS resource 8 |

TABLE 11

| Second correspondence | |
| --- | --- |
| Bit value | Second SRS resource indicated |
| 000 | SRS resources 5, 6 |
| 001 | SRS resources 5, 7 |
| 010 | SRS resources 5, 8 |
| 011 | SRS resources 6, 7 |
| 100 | SRS resources 6, 8 |
| 101 | SRS resources 7, 8 |

TABLE 12

| Second correspondence | |
| --- | --- |
| Bit value | Second SRS resource indicated |
| 000 | SRS resources 5, 6, 7 |
| 001 | SRS resources 5, 6, 8 |
| 010 | SRS resources 6, 7, 8 |
| 011 | SRS resources 5, 7, 8 |

TABLE 13

| Second correspondence | |
| --- | --- |
| Bit value | Second SRS resource indicated |
| 000 | SRS resources 5, 6, 7, 8 |

Step S1005, the terminal device performs blind detection on the PDCCH transmitted by the network device, determines resource indication information indicated by the first indication and the second indication in the PDCCH, such as the number of transmission layers and/or the SRS resource, and performs multi-beam PUSCH repetitions according to the resource indication information determined.

Example 4

Steps in this example are similar to those in example 1 but somewhat different in parameter and method, and therefore will be described like the steps in example 1.

Step S1001: the network device configures the uplink repetitions of the terminal device to be non-codebook-based transmission, and configures a resource set required for the uplink repetitions and sets the pre-defined number of transmission layers.

Specifically, in this example, the network device configures two SRS resource sets for the terminal device, where SRS resource set 0 has four SRS resources, and SRS resource set 1 has three SRS resources (assuming that the three SRS resources are SRS resource 5, SRS resource 8, and SRS resource 9).

Assume that a supportable transmission capability (also referred to as "the number of transmission layers supported by the terminal device") reported by the terminal device is four layers. As described above, the supportable transmission capability reported by the terminal device may be the maximum number of MIMO layers or the maximum number of transmission layers supported by the terminal device, which will not be elaborated again herein. However, since SRS resource set 1 has only three SRS resources, the network device determines that the pre-defined number of transmission layers is three. That is, the pre-defined number of transmission layers may be determined according to: the first pre-defined number of transmission layers $L_1$ depending on the number of transmission layers supported by the terminal device, and at least one of the number of resources in the first SRS resource set or the number of resources in the second SRS resource set.

In addition, as mentioned above, the pre-defined number of transmission layers may be determined by at least one of: the first pre-defined number of transmission layers $L_1$, where the first pre-defined number of transmission layers $L_1$ depends on the number of transmission layers supported by the terminal device; the second pre-defined number of transmission layers $L_2$, where the second pre-defined number of transmission layers $L_2$ is a specific number of transmission layers pre-set for multi-beam transmission; or the third pre-defined number of transmission layers $L_3$, where the third pre-defined number of transmission layers $L_3$ is determined according to at least one of the number of SRS resources in the first SRS resource set and the number of SRS resources in the second SRS resource set.

For the case above, suppose that the specific number of transmission layers pre-set for multi-beam transmission, that is, the second pre-defined number of transmission layers $L_2$, is two, and if the pre-defined number of transmission layers is determined according to a combination of the first pre-defined number of transmission layers $L_1$, the second pre-defined number of transmission layers $L_2$, and the third pre-defined number of transmission layers $L_3$, the pre-defined number of transmission layers may be determined to be the minimum (i.e. two) among the three above.

It should be noted that, the above merely gives several examples of determining the pre-defined number of transmission layers, rather than lists all the cases. In addition, all cases that conform to the method for determining the pre-defined number of transmission layers described in the disclosure shall fall within the protection scope of the disclosure.

Step S1002 and step S1003 are similar to those in example 1, and therefore will not be elaborated again herein.

Step S1004, the network device determines the SRI information including the first indication and the second indication, that is, determines the number of bits and the bit value of the first indication and the number of bits and the bit value of the second indication, and sends the SRI information to the terminal device on a PDCCH.

The network device determines that the number of transmission layers to be used by the terminal device is three (equal to the determined pre-defined number of transmission layers), and based on a channel detection result, selects SRS resource 0, SRS resource 1, and SRS resource 3 in SRS resource set 1 as the first SRS resource. In this case, the network device can determine, according to formula 1, that the number of bits of the first indication is four (the total number of all the possibilities is $C_4^1+C_4^2+C_4^3=14$).

As such, according to table 2, it may be determined that the bit value of the first indication is "1011".

The number of bits of the second indication may be determined according to the number of transmission layers to be used (i.e. three) and the number of SRS resources in the second SRS resource set (i.e. three). There is only one possibility when selecting three SRS resources from the three SRS resources (namely, all the SRS resources, i. e. SRS resource 5, SRS resource 8, and SRS resource 9, in the second SRS resource set), and therefore, it can be determined that the number of bits of the second indication is one. In addition, it may be determined, from table 14 below, that the bit value of the second indication is "1" (or "0", depending on the definition of the bit value in a corresponding table of correspondence).

TABLE 14

| Second correspondence | |
|---|---|
| Bit value | Second SRS resource indicated |
| 1 | SRS resources 5, 8, 9 |

In addition, as described in example 3, considering that different numbers of bits of the second indication will result in different total numbers of bits of the PDCCH which in turn will increase complexity in blind detection, a scheme of using a fixed number of bits for the second indication may also be adopted. As described above, the maximum number of bits (i.e. three) may be used as the number of bits of the second indication, and thus a corresponding bit value may be determined according to a corresponding table of the second correspondence, which will not be elaborated again herein.

Step S1005, the terminal device performs blind detection on the PDCCH transmitted by the network device, determines resource indication information indicated by the first indication and the second indication in the PDCCH, such as the number of transmission layers and/or the SRS resource, and performs multi-beam PUSCH repetitions according to the resource indication information determined.

The above has elaborated the transmission method as well as some variations thereof according to implementations of the disclosure with reference to several examples.

Figure 12:
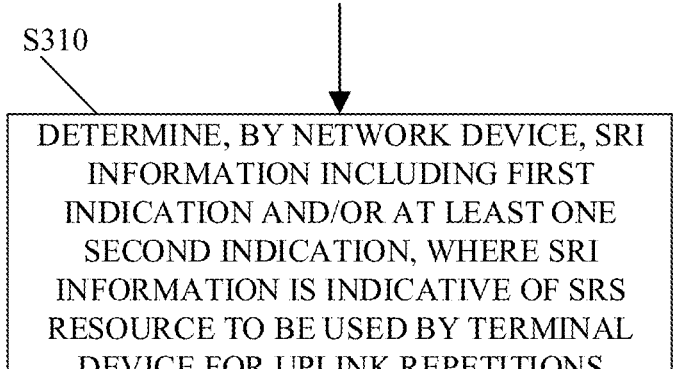
FIG. 12 is a schematic flowchart of a transmission method according to another implementation of this application.

FIG. 12 illustrates a transmission method according to another implementation of the disclosure. The method includes the following.

S310, a network device determines SRI information. The SRI information is indicative of an SRS resource to be used by a terminal device for uplink repetitions. The SRI information includes a first indication and/or at least one second indication, where the first indication indicates the number of transmission layers and a first SRS resource to be used by the terminal device for a first transmission in the uplink repetitions, and the second indication indicates a second SRS resource to be used by the terminal device for a second transmission in the uplink repetitions. A receiver and/or a beam direction for the first transmission is different from a receiver and/or a beam direction for the second transmission.

The second indication contains or does not contain an indication of the number of transmission layers to be used by the terminal device for the second transmission.

Optionally, when the second indication does not contain the indication of the number of transmission layers to be used by the terminal device for the second transmission, the number of transmission layers to be used by the terminal device for the second transmission is determined according to the number of transmission layers indicated by the first indication.

Optionally, based on the SRI information received, a non-codebook-based first transmission is performed by the terminal device by using the number of transmission layers and the first SRS resource indicated by the first indication; and/or based on the SRI information received, a non-codebook-based second transmission is performed by the terminal device by using the number of transmission layers indicated by the first indication or the number of transmission layers indicated by the second indication, and the second SRS resource indicated by the second indication.

Optionally, the network device determines the SRI information as follows. The network device selects, from a first SRS resource set configured for the terminal device, the first SRS resource to be indicated by the first indication, and selects, from a second SRS resource set configured for the terminal device, the second SRS resource to be indicated by the second indication.

Optionally, the first SRS resource includes one or more SRS resources, and/or the second SRS resource includes one or more SRS resources.

Optionally, the number of SRS resources in the first SRS resource set is equal to or different from the number of SRS resources in the second SRS resource set.

Optionally, the number of transmission layers indicated by the first indication does not exceed a pre-defined number of transmission layers.

Optionally, the pre-defined number of transmission layers is determined according to at least one of: a first pre-defined number of transmission layers $L_1$, where the first pre-defined number of transmission layers $L_1$ depends on the number of transmission layers supported by the terminal device; a second pre-defined number of transmission layers $L_2$, where the second pre-defined number of transmission layers $L_2$ is the number of transmission layers that is set for the uplink repetitions; or a third pre-defined number of transmission layers $L_3$, where the third pre-defined number of transmission layers $L_3$ is determined according to at least one of the number of SRS resources in the first SRS resource set or the number of SRS resources in the second SRS resource set.

Optionally, the first pre-defined number of transmission layers $L_1$ is determined by the terminal device and then sent to the network device, or the first pre-defined number of transmission layers $L_1$ is determined by the network device. When the terminal device supports a maximum number of MIMO layers and the maximum number of MIMO layers is configured, the first pre-defined number of transmission layers $L_1$ is the maximum number of MIMO layers; otherwise, the first pre-defined number of transmission layers $L_1$ is a maximum number of transmission layers supported by the terminal device.

Optionally, the pre-defined number of transmission layers is a minimum between the first pre-defined number of transmission layers $L_1$ and the second pre-defined number of transmission layers $L_2$.

Optionally, the pre-defined number of transmission layers is a minimum among the first pre-defined number of transmission layers $L_1$, the second pre-defined number of transmission layers $L_2$, and the third pre-defined number of transmission layers $L_3$.

Optionally, the network device determines the SRI information as follows. Through uplink channel detection based on an SRS transmitted by the terminal device, the network device determines the number of transmission layers and the first SRS resource to be indicated by the first indication and the second SRS resource to be indicated by the second indication.

Optionally, the first indication and the second indication are contained in the same PDCCH or different PDCCHs.

Optionally, the first indication and the second indication are respectively contained in different SRI fields in the same PDCCH, or the first indication and the second indication are contained in the same SRI field in the same PDCCH.

Optionally, the network device determines the number of bits of the first indication according to: the pre-defined number of transmission layers or the number of transmission layers to be used for the first transmission, and at least one of the number of SRS resources in the first SRS resource set or the number of SRS resources in the second SRS resource set; and/or the network device determines the number of bits of the second indication according to: the pre-defined number of transmission layers or the number of transmission layers to be used for the second transmission, and at least one of the number of SRS resources in the first SRS resource set or the number of SRS resources in the second SRS resource set.

Optionally, the uplink repetitions of the terminal device are intended for multiple receivers and/or different beam directions, or the uplink repetitions of the terminal device are intended for a single receiver and/or a single beam direction.

Optionally, the SRI information including the first indication and/or the at least one second indication specifically includes: the SRI information includes the first indication, and the uplink repetitions of the terminal device are intended for a single receiver and/or a single beam direction.

Optionally, non-codebook-based uplink repetitions are performed by the terminal device for a single receiver and/or a single beam direction, in response to only the first indication being received.

Optionally, the network device determines the SRI information as follows. The network device determines a bit value of the first indication according to a first correspondence, where the first correspondence is a correspondence between an SRS resource in the first SRS resource set and a first set of bit values; and/or the network device determines a bit value of the second indication according to a second correspondence, where the second correspondence is a correspondence between an SRS resource in the second SRS resource set and a second set of bit values.

Optionally, the number of transmission layers and/or the first SRS resource indicated by the first indication is determined by the terminal device according to the first correspondence; and/or the second SRS resource indicated by the second indication is determined by the terminal device according to the number of transmission layers indicated by the first indication and the second correspondence, or the number of transmission layers and/or the second SRS resource indicated by the second indication is determined by the terminal device according to the second correspondence.

Optionally, when the number of SRS resources in the first SRS resource set is one, the number of bits of the first indication is one; and/or when the number of SRS resources in the second SRS resource set is one, the number of bits of the second indication is one.

Optionally, when the second indication does not contain the indication of the number of transmission layers to be used for the second transmission, the network device determines the number of bits of the second indication according to the number of transmission layers indicated by the first indication and the number of SRS resources in the second SRS resource set.

Optionally, the network device determines a maximum among numbers of bits that are determined according to different numbers of transmission layers and the number of SRS resources in the second SRS resource set as the number of bits of the second indication, where each of the different numbers of transmission layers does not exceed the pre-defined number of transmission layers.

Optionally, the receiver includes a TRP.

Optionally, the terminal device may determine, according to the number of transmission layers indicated by the first indication, the number (that is, quantity) of the second SRS resource to be used by the terminal device, and the terminal device may determine, according to the second indication, the second SRS resource to be used by the terminal device.

In the implementation of the disclosure, the number of the second SRS resource to be used can be firstly determined according to the number of transmission layers indicated by the first indication, and then the second SRS resource to be used by the terminal device can be determined according to the second indication. For example, the number of transmission layers may be equal to the number of the first SRS resource/the number of the second SRS resource, and in this case, the number of the second SRS resource is equal to the number of the first SRS resource. As such, the second indication only needs to indicate the specific SRS resource to be used without indicating the number of the second SRS resource. In this way, it is possible at least to save the number of bits of the second indication, thereby improving coding rate and resource utilization.

Figure 13:
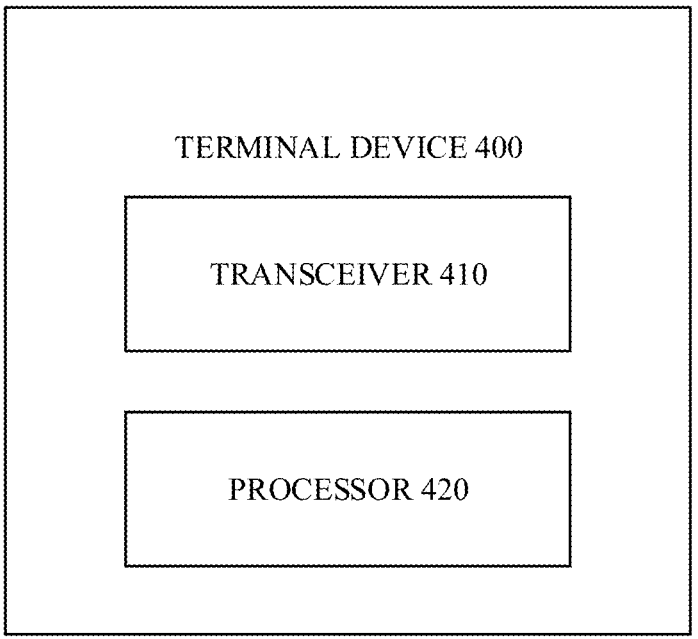
FIG. 13 is a schematic block diagram of a terminal device according to an implementation of the disclosure.

FIG. 13 is a schematic block diagram of a terminal device according to an implementation of the disclosure.

As illustrated in FIG. 13, the terminal device 400 according to implementations of the disclosure may include, for example, a transceiver 410 and a processor 420. The transceiver 410 is configured to receive SRI information, where the SRI information is indicative of an SRS resource to be used by the terminal device for uplink repetitions, and the SRI information includes a first indication and/or at least one second indication. The processor 420 is configured to parse the SRI information received, to obtain the number of transmission layers and a first SRS resource that are indicated by the first indication and to be used by the terminal device for a first transmission in the uplink repetitions, and a second SRS resource that is indicated by the second indication and to be used by the terminal device for a second transmission in the uplink repetitions.

The processor 420 may include an encoder, a decoder, etc.

The second indication contains or does not contain an indication of the number of transmission layers to be used by the terminal device for the second transmission.

Optionally, when the second indication does not contain the indication of the number of transmission layers to be used by the terminal device for the second transmission, the number of transmission layers to be used by the terminal device for the second transmission is determined according to the number of transmission layers indicated by the first indication.

Optionally, based on the SRI information received, a non-codebook-based first transmission is performed by the terminal device by using the number of transmission layers and the first SRS resource indicated by the first indication; and/or based on the SRI information received, a non-codebook-based second transmission is performed by the terminal device by using the number of transmission layers indicated by the first indication or the number of transmission layers indicated by the second indication, and the second SRS resource indicated by the second indication.

Optionally, a first pre-defined number of transmission layers $L_1$ is determined by the processor of the terminal device and then sent to a network device, or the first pre-defined number of transmission layers $L_1$ is determined by the network device. When the terminal device supports a maximum number of multi-input multi-output (MIMO) layers and the maximum number of MIMO layers is configured, the first pre-defined number of transmission layers $L_1$ is the maximum number of MIMO layers; otherwise, the first pre-defined number of transmission layers $L_1$ is a maximum number of transmission layers supported by the terminal device.

Optionally, the number of transmission layers and the first SRS resource indicated by the first indication and the second SRS resource indicated by the second indication are determined through uplink channel detection performed by the network device based on an SRS transmitted by the terminal device.

Optionally, non-codebook-based uplink repetitions are performed by the terminal device for a single receiver and/or a single beam direction, in response to only the first indication being received.

Optionally, the processor is further configured to: determine, according to a first correspondence, the number of transmission layers and/or the first SRS resource indicated by the first indication; and/or determine, according to the number of transmission layers indicated by the first indication and a second correspondence, the second SRS resource indicated by the second indication, or determine, according to the second correspondence, the number of transmission layers and/or the second SRS resource indicated by the second indication.

It should be understood that, operations and/or functions of various devices, units, modules, etc. (for example, the transceiver 410 and the processor 420 above) in the terminal device according to implementations of the disclosure are intended to implement corresponding operations and/or functions performed by the terminal device in the foregoing methods, which will not be elaborated again herein for the sake of brevity.

Figure 14:
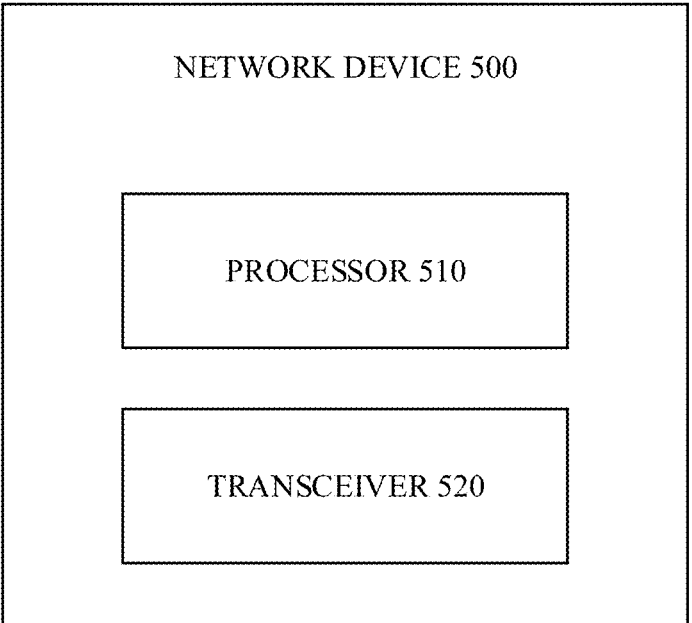
FIG. 14 is a schematic block diagram of a network device according to an implementation of the disclosure.

FIG. 14 is a schematic block diagram of a network device according to an implementation of the disclosure.

As illustrated in FIG. 14, the network device 500 according to implementations of the disclosure may include, for example, a processor 510 and a transceiver 520. The processor 510 is configured to determine SRI information, where the SRI information is indicative of an SRS resource to be used by a terminal device for uplink repetitions, and the SRI information includes first indication and/or at least one second indication. The transceiver 520 is configured to send the determined SRI information to the terminal device. The first indication indicates the number of transmission layers and a first SRS resource to be used by the terminal device for a first transmission in the uplink repetitions, the second indication indicates a second SRS resource to be used by the terminal device for a second transmission in the uplink repetitions, and a receiver and/or a beam direction for the first transmission is different from a receiver and/or a beam direction for the second transmission.

Optionally, the processor 510 is configured to select, from a first SRS resource set configured for the terminal device, the first SRS resource to be indicated by the first indication, and select, from a second SRS resource set configured for the terminal device, the second SRS resource to be indicated by the second indication.

Optionally, the processor 510 is configured to determine the number of bits of the first indication according to: the pre-defined number of transmission layers or the number of transmission layers to be used for the first transmission that is determined according to the first indication, and at least one of the number of SRS resources in the first SRS resource set or the number of SRS resources in the second SRS resource set; and/or determine the number of bits of the second indication according to: the pre-defined number of transmission layers or the number of transmission layers to be used for the second transmission that is determined according to the second indication, and at least one of the number of SRS resources in the first SRS resource set or the number of SRS resources in the second SRS resource set.

Optionally, the processor 510 is configured to determine the number of bits of the first indication according to: the pre-defined number of transmission layers or the number of transmission layers to be used for the first transmission that is determined according to the first indication, and at least one of the number of SRS resources in the first SRS resource set or the number of SRS resources in the second SRS resource set; and/or determine the number of bits of the second indication according to: the pre-defined number of transmission layers or the number of transmission layers to be used for the second transmission that is determined according to the second indication, and at least one of the number of SRS resources in the first SRS resource set or the number of SRS resources in the second SRS resource set.

Optionally, the processor 510 is configured to determine the number of bits of the second indication according to the number of transmission layers indicated by the first indication and the number of SRS resources in the second SRS resource set, when the second indication does not contain the indication of the number of transmission layers to be used for the second transmission.

Optionally, the processor 510 is configured to determine a maximum among numbers of bits that are determined according to different numbers of transmission layers and the number of SRS resources in the second SRS resource set as the number of bits of the second indication, where each of the different numbers of transmission layers does not exceed the pre-defined number of transmission layers.

It should be understood that, operations and/or functions of various devices, units, modules, etc. (for example, the transceiver 520 and the processor 510 above) in the network device according to implementations of the disclosure are intended to implement corresponding operations and/or functions performed by the network device in the foregoing methods, which will not be elaborated again herein for the sake of brevity.

Figure 15:
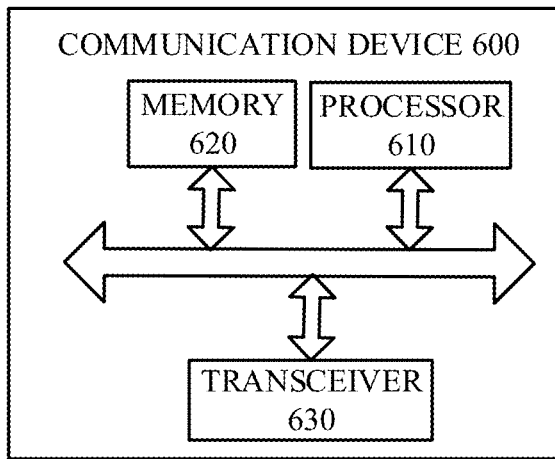
FIG. 15 is a schematic block diagram of a communication device according to an implementation of the disclosure.

FIG. 15 is a schematic structural diagram of a communication device 600 according to implementations of the disclosure. The communication device 600 illustrated in FIG. 15 may include a processor 610 and a memory 620.

The processor 610 can invoke and execute computer programs stored in the memory 620, to perform the method in implementations of the disclosure.

The memory 620 may be a separate device independent of the processor 610, or may be integrated into the processor 610.

Optionally, as illustrated in FIG. 15, the communication device 600 can further include a transceiver 630. The processor 610 can control the transceiver 630 to communicate with other devices, specifically, to transmit information or data to other devices or to receive information or data transmitted by other devices.

The transceiver 630 may include a transmitter and a receiver. The transceiver 630 may further include an antenna, where one or more antennas can be provided.

Optionally, the communication device 600 may be operable as the network device in implementations of the disclosure, and the communication device 600 can implement the operations performed by the network device in various methods in implementations of the disclosure, which will not be elaborated again herein for the sake of simplicity.

Optionally, the communication device 600 may be operable as the terminal device in implementations of the disclosure, and the communication device 600 can implement the operations performed by the terminal device in various methods in implementations of the disclosure, which will not be elaborated again herein for the sake of simplicity.

Figure 16:
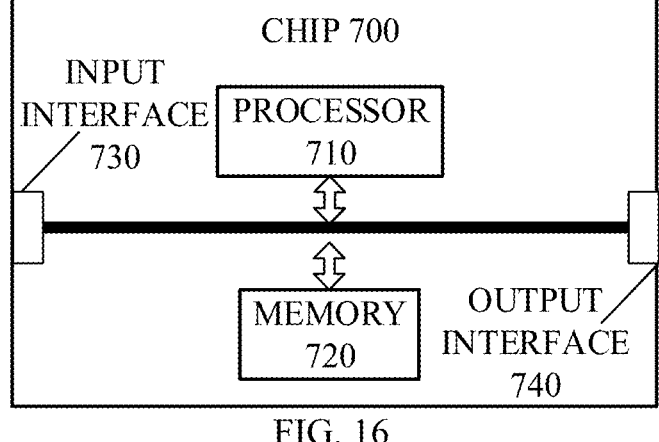
FIG. 16 is a schematic block diagram of a chip according to an implementation of the disclosure.

FIG. 16 is a schematic structural diagram of a chip 700 according to implementations of the disclosure. The chip 700 illustrated in FIG. 16 includes a processor 710 and a memory 720. The processor 710 can invoke and execute computer programs stored in the memory to perform the method in implementations of the disclosure. The memory 720 may be a separate device independent of the processor 710, or may be integrated into the processor 710.

Optionally, the chip 700 may further include an input interface 730. The processor 710 can control the input interface 730 to communicate with other devices or chips, specifically, to obtain information or data transmitted by other devices or chips.

Optionally, the chip 700 may further include an output interface 740. The processor 710 can control the output interface 740 to communicate with other devices or chips, specifically, to output information or data to other devices or chips.

Optionally, the chip is applicable to the network device in implementations of the disclosure. The chip can implement the operations performed by the network device in various methods in implementations of the disclosure, which will not be elaborated again herein for the sake of simplicity.

Optionally, the chip is applicable to the terminal device in implementations of the disclosure. The chip can implement the operations performed by the terminal device in various methods in implementations in the disclosure, which will not be elaborated again herein for the sake of simplicity.

It should be understood that, the chip referred to in implementations of the disclosure may also be referred to as a system-on-chip (SOC).

The processor mentioned above may be a general-purpose processor, a digital signal processor (DSP), an application specific integrated circuit (ASIC), a field programmable gate array (FPGA), an application specific integrated circuit (ASIC), or other programmable logic devices, transistor logic devices, discrete hardware components. The general purpose processor may be a microprocessor, or the processor may be any conventional processor or the like.

The memory mentioned above may be a volatile memory or a non-volatile memory, or may include both the volatile memory and the non-volatile memory. The non-volatile memory may be a read-only memory (ROM), a programmable ROM (PROM), an erasable PROM (EPROM), an electrically EPROM (EEPROM), or flash memory. The volatile memory can be a random access memory (RAM).

It should be understood that, the memory above is intended for illustration rather than limitation. For example, the memory in implementations of the disclosure may also be a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM), etc. In other words, the memory in implementations of the disclosure is intended to include, but is not limited to, these and any other suitable types of memory.

Figure 17:
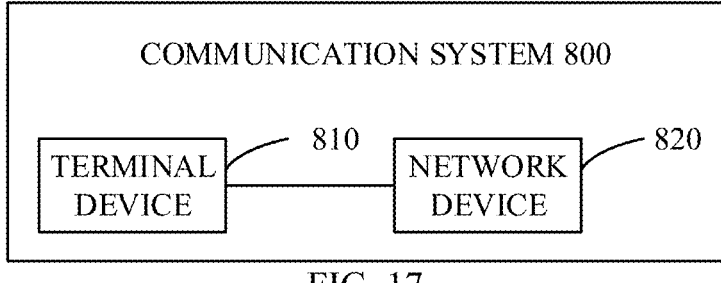
FIG. 17 is a schematic block diagram of a communication system according to an implementation of the disclosure.

FIG. 17 is a schematic block diagram of a communication system 800 according to implementations of the disclosure. As illustrated in FIG. 17, the communication system 800 includes a terminal device 810 and a network device 820.

The terminal device 810 may implement functions of the terminal device in the foregoing methods, or may be the terminal device 400 or the communication device 600 operable as a terminal device, The network device 820 may implement functions of the network device in the foregoing methods, or may be the network device 500 or the communication device 600 operable as a network device, which will not be elaborated again herein for the sake of simplicity.

All or some of the above implementations can be implemented through software, hardware, firmware, or any other combination thereof. When implemented by software, all or some of the above implementations can be implemented in the form of a computer program product. The computer program product includes one or more computer instructions. When the computer instructions are applied and executed on a computer, all or some of the operations or functions of the implementations of the disclosure are performed. The computer can be a general-purpose computer, a special-purpose computer, a computer network, or other programmable apparatuses. The computer instruction can be stored in a computer readable storage medium, or transmitted from one computer readable storage medium to another computer readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer readable storage medium can be any computer accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

It should also be understood that, in various method implementations of the disclosure, the magnitude of a sequence number of each of the foregoing processes does not mean an execution order, and an execution order of each process should be determined according to a function and an internal logic of the process, which shall not constitute any limitation to an implementation process of implementations of the disclosure.

It will be evident to those skilled in the art that, for the sake of convenience and brevity, in terms of the working processes of the foregoing systems, apparatuses, and units, reference can be made to the corresponding processes of the above method implementations, which will not be elaborated again herein.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A transmission method, comprising:
receiving, by a terminal device, sounding reference signal (SRS) resource indicator (SRI) information, the SRI information being indicative of an SRS resource to be used by the terminal device for uplink repetitions;
wherein the SRI information comprises a first indication and/or at least one second indication, the first indication indicates a number of transmission layers and a first SRS resource to be used by the terminal device for a first transmission in the uplink repetitions, and the second indication indicates a second SRS resource to be used by the terminal device for a second transmission in the uplink repetitions; and
wherein a receiver and/or a beam direction for the first transmission is different from a receiver and/or a beam direction for the second transmission;
wherein the second indication does not contain the indication of the number of transmission layers to be used by the terminal device for the second transmission, the number of transmission layers to be used by the terminal device for the second transmission is determined according to the number of transmission layers indicated by the first indication.

2. The method of claim 1, further comprising:
based on the SRI information received, performing, by the terminal device, a non-codebook-based first transmission by using the number of transmission layers and the first SRS resource indicated by the first indication; and/or
based on the SRI information received, performing, by the terminal device, a non-codebook-based second transmission by using the number of transmission layers indicated by the first indication or the number of transmission layers indicated by the second indication, and the second SRS resource indicated by the second indication.

3. The method of claim 1, wherein the first indication and the second indication are respectively contained in different SRI fields in a same PDCCH, or the first indication and the second indication are contained in the same SRI field in the same PDCCH.

4. The method of claim 1, wherein:
a bit value of the first indication is determined according to a first correspondence, wherein the first correspondence is a correspondence between an SRS resource in a first SRS resource set and a first set of bit values; and/or
a bit value of the second indication is determined according to a second correspondence, wherein the second correspondence is a correspondence between an SRS resource in a second SRS resource set and a second set of bit values.

5. The method of claim 4, further comprising:
determining according to the first correspondence, by the terminal device, the number of transmission layers and/or the first SRS resource indicated by the first indication; and/or
determining according to the number of transmission layers indicated by the first indication and the second correspondence, by the terminal device, the second SRS resource indicated by the second indication, or determining according to the second correspondence, by the terminal device, the number of transmission layers and/or the second SRS resource indicated by the second indication.

6. The method of claim 1, wherein:
when the number of SRS resources in a first SRS resource set is one, a number of bits of the first indication is one; and/or
when the number of SRS resources in a second SRS resource set is one, a number of bits of the second indication is one.

7. A terminal device, comprising:
a transceiver configured to receive sounding reference signal (SRS) resource indicator (SRI) information, the SRI information being indicative of an SRS resource to be used by the terminal device for uplink repetitions, and the SRI information comprising a first indication and/or at least one second indication; and
a processor configured to parse the SRI information received, to obtain a number of transmission layers and a first SRS resource that are indicated by the first indication and to be used by the terminal device for a first transmission in the uplink repetitions, and a second SRS resource that is indicated by the second indication and to be used by the terminal device for a second transmission in the uplink repetitions;
wherein the second indication does not contain the indication of the number of transmission layers to be used by the terminal device for the second transmission, the number of transmission layers to be used by the terminal device for the second transmission is determined according to the number of transmission layers indicated by the first indication.

8. The terminal device of claim 7, wherein:
based on the SRI information received, a non-codebook-based first transmission is performed by the terminal device by using the number of transmission layers and the first SRS resource indicated by the first indication; and/or
based on the SRI information received, a non-codebook-based second transmission is performed by the terminal device by using the number of transmission layers indicated by the first indication or the number of transmission layers indicated by the second indication, and the second SRS resource indicated by the second indication.

9. The terminal device of claim 7, wherein the first SRS resource is selected from a first SRS resource set configured for the terminal device, and the second SRS resource is selected from a second SRS resource set configured for the terminal device.

10. A network device, comprising:

a processor configured to determine sounding reference signal (SRS) resource indicator (SRI) information, the SRI information being indicative of an SRS resource to be used by a terminal device for uplink repetitions, and the SRI information comprising first indication and/or at least one second indication; and a transceiver configured to send the determined SRI information to the terminal device;

wherein the first indication indicates a number of transmission layers and a first SRS resource to be used by the terminal device for a first transmission in the uplink repetitions, the second indication indicates a second SRS resource to be used by the terminal device for a second transmission in the uplink repetitions, and a receiver and/or a beam direction for the first transmission is different from a receiver and/or a beam direction for the second transmission;

wherein the second indication does not contain the indication of the number of transmission layers to be used by the terminal device for the second transmission, the number of transmission layers to be used by the terminal device for the second transmission is determined according to the number of transmission layers indicated by the first indication.

11. The network device of claim 10, wherein:

based on the SRI information received, a non-codebook-based first transmission is performed by the terminal device by using the number of transmission layers and the first SRS resource indicated by the first indication; and/or based on the SRI information received, a non-codebook-based second transmission is performed by the terminal device by using the number of transmission layers indicated by the first indication or the number of transmission layers indicated by the second indication, and the second SRS resource indicated by the second indication.

12. The network device of claim 10, wherein the processor is configured to:

select, from a first SRS resource set configured for the terminal device, the first SRS resource to be indicated by the first indication, and select, from a second SRS resource set configured for the terminal device, the second SRS resource to be indicated by the second indication.

13. The network device of claim 10, wherein the processor is configured to:

determine a bit value of the first indication according to a first correspondence, wherein the first correspondence is a correspondence between an SRS resource in a first SRS resource set and a first set of bit values; and/or determine a bit value of the second indication according to a second correspondence, wherein the second correspondence is a correspondence between an SRS resource in a second SRS resource set and a second set of bit values.

14. The network device of claim 10, wherein:

when the number of SRS resources in a first SRS resource set is one, a number of bits of the first indication is one; and/or when the number of SRS resources in a second SRS resource set is one, a number of bits of the second indication is one.

15. The network device of claim 10, wherein the processor is configured to:

determine a number of bits of the second indication according to the number of transmission layers indicated by the first indication and the number of SRS resources in a second SRS resource set, when the second indication does not contain the indication of the number of transmission layers to be used for the second transmission.

16. The network device of claim 10, wherein the processor is configured to:

determine a maximum among numbers of bits that are determined according to different numbers of transmission layers and the number of SRS resources in the second SRS resource set as the number of bits of the second indication, wherein each of the different numbers of transmission layers does not exceed a predefined number of transmission layers.

* * * * *